(12) United States Patent
Martin

(10) Patent No.: US 6,188,518 B1
(45) Date of Patent: Feb. 13, 2001

(54) METHOD AND APPARATUS FOR USE IN PRODUCING THREE-DIMENSIONAL IMAGERY

(76) Inventor: Donald Lewis Maunsell Martin, 3/53A Shadforth Avenue, Mosman, New South Wales, 2088 (AU)

(*) Notice: Under 35 U.S.C. 154(b), the term of this patent shall be extended for 0 days.

(21) Appl. No.: 09/193,318

(22) Filed: Nov. 16, 1998

Related U.S. Application Data

(62) Continuation-in-part of application No. 08/717,484, filed on Sep. 20, 1996, now abandoned, which is a continuation-in-part of application No. 08/211,107, filed as application No. PCT/AU94/00030 on Jan. 24, 1994, now abandoned.

(30) Foreign Application Priority Data

Jan. 22, 1993 (AU) .................................................. PL6925

(51) Int. Cl.$^7$ .......................... G02B 27/22; G02B 27/24; H04N 13/04; H04N 15/00
(52) U.S. Cl. .......................... 359/464; 359/462; 359/466; 359/469; 359/472; 348/51; 348/56
(58) Field of Search ..................... 359/462, 464, 359/465, 466, 469, 468; 348/51, 56; 352/58, 81

(56) References Cited

U.S. PATENT DOCUMENTS

| | | |
|---|---|---|
| 4,729,011 | 3/1988 | Sayanagi . |
| 4,740,073 * | 4/1988 | Meacham ............................... 352/58 |
| 4,807,965 | 2/1989 | Garakani . |
| 5,315,377 * | 5/1994 | Isono et al. ............................ 348/51 |
| 5,465,175 | 11/1995 | Woodgate, et al. .................. 359/463 |

FOREIGN PATENT DOCUMENTS

| | | |
|---|---|---|
| 13076/92 | 10/1992 | (AU) . |
| 4038475 | 6/1992 | (DE) . |
| 4123895 | 1/1993 | (DE) . |
| 4228111 | 6/1993 | (DE) . |
| 316465 | 5/1989 | (EP) . |
| 481879 | 3/1938 | (GB) . |
| 570594 | 7/1945 | (GB) . |
| 577820 | 6/1946 | (GB) . |
| 602794 | 6/1948 | (GB) . |
| 2252175 | 7/1992 | (GB) . |
| 4250439 | 9/1992 | (JP) . |
| 90/03086 | 3/1990 | (WO) . |
| 92/11735 | 7/1992 | (WO) . |

OTHER PUBLICATIONS

*3–D TV WITHOUT GLASSES*, Richard E. Holmes, IEEE, 1991

* cited by examiner

Primary Examiner—Audrey Chang
(74) Attorney, Agent, or Firm—Abelman, Frayne & Schwab

(57) ABSTRACT

A method of producing three-dimensional imagery including displaying on a screen surface, imagery containing two or more spaced apart angles of view about a common centre of a subject of the imagery; and which angles of view have been segmented and separated; the segmented and separated angles of view being viewed through sections of a grid, of a size and shape corresponding substantially to the dimensions of the segments of imagery; the grid being placed at a distance from the screen where segments of imagery acquired left of the common image centre are seen through sections of the grid substantially by the left eye of the viewer, while segments of imagery acquired right of the common image centre are seen through grid sections substantially by the right eye of the viewer; the relationship of left and right segments of imagery, relative to the grid sections, being maintained when the imagery is displayed on the screen, by oscillation of the grid sections in synchronisation with an alternating display of alternate segments of imagery at a speed which produces the appearance of a coherent, complete, three-dimensional imagery.

20 Claims, 13 Drawing Sheets

METHOD AND APPARATUS FOR USE IN PRODUCING THREE-DIMENSIONAL IMAGERY

CROSS-REFERENCE TO RELATED APPLICATIONS

This application is a continuation-in-part of U.S. application Ser. No. 08/717,484, filed Sep. 20, 1996, now abandoned, which is a continuation-in-part of U.S. application Ser. No. 08/211,107, filed Mar. 16, 1994, now abandoned, which is the National Stage of International Application Number PCT/AU94/00030, filed on Jan. 24, 1994.

FIELD OF INVENTION

The present invention relates to a method and apparatus for use in producing three-dimensional imagery.

DESCRIPTION OF THE RELATED ART

Up until this time, three-dimensional imagery has essentially been produced with means that present different aspects of objects to each eye and usually with filtered, polarised or oscillating imagery that can be observed through filtered, polarised and/or oscillating viewers or spectacles. Lenticular arrays, static or dynamic double vision strips and viewing slots arrangements also attempt a similar effect without the use of such viewers or spectacles.

The term "three-dimensional imagery" is an expression that has been in common use for many years. Since its first use, the meaning of the term has been extended to encompass a wide variety of depth enhancement imagery, as well as imagery that actually contains three visual dimensions. Within the range of relevant methodologies, equipment and effects, there can be said to be two broad and general categories.

One of these categories involves imagery containing a single angle of view of an object. The other applies to images that simultaneously comprise two or more angles of view of essentially the same object.

Methods and apparatus that enable the presentation of two or more different angles of view of substantially the same objects simultaneously, are also referred to as three-dimensional. Usually, these arrangements present two spaced angles of view, acquired at distances of 2¼–2½ inches apart with a common centre, by the use of methods and means that isolate left views to left eyes and right views to right eyes. Left and right view separated systems include spectacles, viewers and visors ranging in sophistication from (as indicated hereinbefore) simple filtered or polarised spectacles to liquid crystal visors synchronised to screen signals. Other techniques for keeping left and right angles of view visible only to the corresponding eye include view differentiating lenses—particularly lenticular arrays and separated static right and left image strip arrangements.

In addition, holograms produce three-dimensional imagery containing multiple angles of view. Further, there are many combinations of these various systems.

However, despite the abundance of methods and techniques for enhancing image depth and producing imagery containing three visual dimensions, all have very limited application and have had limited commercial and practical success. In particular, none of the known systems are suitable for adaptation to most imaging systems in general use, such as for example cinemas, video and computer display units, television screens and the wide variety of monitors used in every day life for functions ranging from medical investigations, to entertainment, to military surveillance.

It is an object of at least one aspect of the present invention to provide a method and means for displaying three-dimensional imagery which goes some way towards overcoming or minimising problems and shortcomings associated with methods and means known up until this time.

Other objects of this invention will become apparent from the following description.

In the broadest form of the method aspect the present invention comprises:

a method of producing three-dimensional imagery including displaying on a screen surface, imagery containing two or more spaced-apart angles of view about a common centre, and which angles of view have been segmented and separated; said separated and segmented angles of view being viewed through sections of a grid, of a size and shape corresponding substantially to the dimensions of said segments of imagery; said grid being placed at a distance from said screen where segments of imagery acquired left of a common image centre are seen through sections of said grid substantially by the left eye of a viewer, while segments of imagery acquired right of the common image centre are seen through grid sections substantially by the right eye of a viewer; the relationship of left and right segments of imagery, relative to said grid sections being maintained when said imagery is displayed on said screen, by oscillation of said grid sections in synchronisation with the display of said segments of imagery at a speed which produces the appearance of a coherent, complete, three-dimensional imagery.

According to a further method aspect of this invention there is provided a method of producing three-dimensional imagery including displaying on a screen surface, imagery containing two or more spaced-apart angles of view about a common centre, and which angles of view have been segmented and separated; said separated and segmented angles of view being viewed through sections of a grid, of a size and shape corresponding substantially to the dimensions of said segments of imagery; said grid being placed at a distance from said screen where segments of imagery acquired left of a common image centre are seen through sections of said grid substantially by the left eye of a viewer, while segments of imagery acquired right of the common image centre are seen through grid sections substantially by the right eye of a viewer; the relationship of left and right segments of imagery, relative to said grid sections being maintained when said imagery is displayed on said screen, by oscillation of said grid sections in synchronisation with the display of said segments of imagery at a speed which produces the appearance of a coherent, complete, three-dimensional imagery; and wherein said grid sections become substantially invisible to the eye as a transparent window between said eyes of a viewer and said screen.

In another form of the method aspect the present invention comprises:

a method of producing three dimensional imagery comprising the steps of:
a) displaying on a screen imagery formed by two or more spaced apart angles of view about a common centre,
b) placing a segmented grid formed by a series of alternate spaced apart slats and openings in front of the screen between an observer and the screen such that the observer initially observes the image on the screen as separated and segmented, wherein the grid is of a size and shape which corresponds substantially to the size of the image segments, seen by the observer, c) setting the grid at a pre-determined distance from the screen such that alternate segments of imagery acquired left of a common image centre are seen through openings of said grid substantially by the left eye of an observer while alternate segments of imagery acquired right of the common image centre are seen through openings of the grid substantially by the right eye of an observer such that part of the whole image on the screen is seen by the right and left eyes of the observer at a first position of the grid;

d) oscillating the grid relative to the image on the screen at a predetermined frequency such that the grid moves from said first position momentarily to a second position thence back to the first position whereupon when the grid is momentarily in said second position during said oscillation, the left eye of the observer sees that part of the image left of the common centre which was blocked from view to the left eye at the first position of the grid by said alternate slats and the right eye of the observer sees that part of the image right of the common centre which was blocked from view to the right eye at the first position of the grid by said alternate slats, such that by virtue of the oscillation of the grid at said predetermined frequency, the grid is rendered invisible and the observer sees a whole coherent three dimensional image by alternately observing a part of the available image thence the remaining part of the available image on the screen.

According to a further aspect of this invention there is provided an arrangement for producing three-dimensional imagery, including means for displaying on a screen surface imagery containing two or more spaced apart adjacent angles of view about a common centre and which angles of view have been segmented and separated; a grid means being provided in front of said screen such that said separated and segmented angles of view of said imagery are viewed through sections of said grid, of a size and shape corresponding substantially to dimensions of said segments of imagery; said grid means being spaced apart from said screen by a distance, such that segments of imagery acquired left of a common image centre are seen through sections of said grid substantially by the left eye of a viewer, while segments of imagery acquired right of the common image centre are seen through grid sections substantially by the right eye of a viewer; the relationship of left and right segments of imagery, relative to said grid sections being maintained when said imagery is displayed of said screen by oscillation of said grid means and grid sections, in synchronisation with the display of said segments of imagery on said screen at a speed which produces the appearance of coherent, complete, three-dimensional imagery.

In another broad form of the apparatus aspect the present invention comprises;

an arrangement for production of a coherent three dimensional image comprising;

a screen on which is projected an image formed by two or more spaced apart angles of view about a common centre;

a segmented grid formed by a series of spaced apart slats and openings placed between an observer and the screen at a predetermined distance from the screen such that the segmented grid creates to the observer screen image segments in a first grid position, wherein, an observer sees alternate segments through said grid openings such that alternate segments of imagery acquired left of a common image centre are seen through openings of said grid exclusively by the left eye of an observer while alternate segments of imagery acquired right of the common image centre are seen through the openings of the grid exclusively by the right eye of an observer such that part only of the image is seen by the right and left eyes of the observer at a first position of the grid, wherein the grid is oscillated relative to the image on the screen at a predetermined frequency such that the grid moves from said first position momentarily to a second position thence back to the first position whereupon when the grid is momentarily in said second position during said oscillation the left eye of the observer sees that part of the image left on the common centre which was blocked from view to the left eye at the first position of the grid by said slats and the right eye of the observer sees that part of the image right of the common centre which was blocked from view to the right eye at the first position of the grid by said slats, such that by virtue of the oscillation of the grid at said predetermined frequency the grid is rendered invisible such that the observer sees a whole coherent three dimensional image by alternately seeing part of the image thence the remaining part of the image on the screen as the grid moves between the first and second positions.

BRIEF DESCRIPTION OF THE ACCOMPANYING DRAWINGS

The invention will be described by way of example only and with reference to the accompanying drawings wherein:

FIG. 1: is a diagrammatic plan view of one form of the present invention;

FIG. 2: is a diagrammatic plan view of a further form of the present invention;

Figure 1:
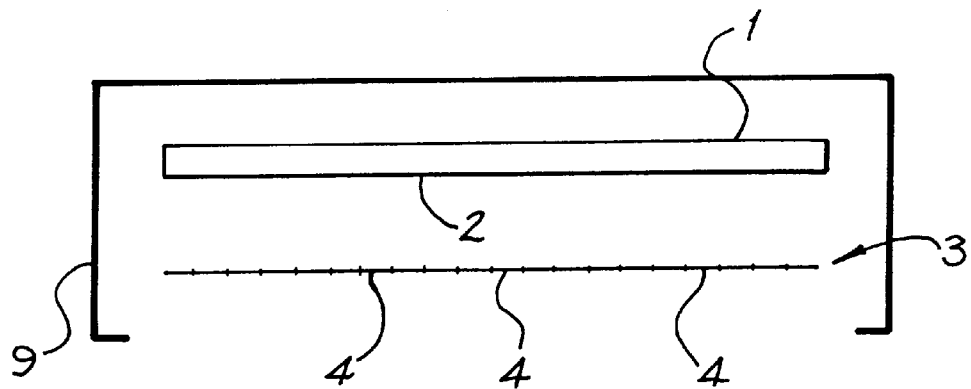

DETAILED DESCRIPTION OF PREFERRED EMBODIMENTS OF THE PRESENT INVENTION AND METHODS OF CARRYING OUT SAME

As described above, this invention provides a method and an apparatus for producing imagery that can be displayed on a screen and viewed through an oscillating grid so that the imagery appears entirely in three physical dimensions.

The invention combines two discoveries. Each of the discoveries are extensions of previous discoveries related to earlier inventions and both of the new discoveries permit improvements on these earlier inventions.

The two improvements, combined together, produce three-dimensional imagery that is practical and commercially viable for many purposes for which it is desired.

The first improvement involves the presentation of three-dimensional imagery on a screen.

Until now it has been believed that it is not possible to present two, or more, angles of view acquired about a common centre of the same object on a screen, in which all elements of each image are fully in alignment, so that, together, the multiple adjacent angles of view appear as a single coherent three-dimensional image, with the exception of the extreme outer edges of the images.

It seems that there are two reasons for this belief. Firstly, because of a general presumption that, for people, three-dimensional imagery is primarily a function of the human eye span.

Secondly, because describing human vision in terms of solid geometry, demonstrates, necessarily, that either eye must see any identical point on a screen at a different position to the other eye.

In the first case there is no set standard at which the varying distances between the pupils of the human eyes are established as optimised, averaged, or otherwise laid down as generally appropriate for everyone to view three-dimensional imagery.

Despite this, it appears accepted widely that for the purposes of producing three-dimensional imagery, two-and-a-quarter to two-and-a-half inches of separation between image centres is required.

Images acquired at this order of separation about a common centre cannot be presented on a screen so that they appear aligned completely in three dimensions to the unaided eyes.

Further, because solid geometric depiction of human observations show that each eye must see the same point at a different position on a screen, it has been held to follow, therefore, that, except for the centre, no points of two, or more, adjacent images acquired from different angles around a common centre can be seen by both unaided eyes in the same position on a screen and, therefore aligned and in three dimensions.

For both these reasons, it seems to have been accepted generally for many years that two or more images of essentially the same object acquired adjacently, in a manner simulating human eye views, cannot be aligned on a screen and, consequently, can be seen in three dimensions only if the images are seen by the respective eyes quite separated so that neither eye can compare any part of the two views on a screen and thus observe two different images.

Human perception of three-dimensional imagery has been widely understood through this century, as the separate and separated viewing of two different angles of view of objects, viewed from positions spaced apart at a distance equivalent to the width of the pupils of the eyes, or about two-and-a-half inches.

The production of three-dimensional imagery has therefore followed this appreciation by presenting it mainly through view differentiating spectacles.

This presentation of three-dimensional imagery with the requirement to wear appropriate viewers appears to be the main impediment to more widespread use of such imagery, due to public resistance to using this type of opticals.

Other attempts, such as applying lenticular arrays to screens have different drawbacks, such as limited viewing area because of the requirement to keep the eyes at the lens focal centre.

Still more different solutions, like holographic approaches, are limited by cost considerations.

It is a primary point of this invention that the basic belief that two or more adjacent angles of view cannot be aligned in three dimensions on a screen for observation by the unaided eyes if fundamentally flawed, and this discovery opens the way to improvements in technology that overcome the impediment of having to wear viewers to see three-dimensional imagery, or use techniques with equal or greater undesirabilities.

In 1923 Demetre Daponte demonstrated that two adjacent angles of view, acquired with centres approximately two-and-half inches apart, could be aligned partially in three dimensions on a screen by alternatively dissolving each view in and out against the other.

Daponte's invention demonstrating this discovery was called "The Pulseometor". It comprised two discs of transparency graduated from complete to zero, rotating in opposite directions so that each angle of view projected through the discs fades and brightens in illumination in opposition to the other view.

Deponte's discovery and invention demonstrated only partial alignment of two images in three dimensions, and the proportion of the images so aligned was small, comprising less than one quarter of the horizontal length of the image.

It is one of the discoveries of this invention that images comprising two, or more, adjacent angles of view, can be aligned completely in three dimensions on a screen, providing that the angle between the views and the distances between the foreground and background of the object are sufficiently small.

In practice, this angle of separation and the distance between the background and the foreground of the object is dependent upon the distance of the object centre; the total depth of field; type of lenses used; centres of focus; and vertical as well as horizontal alignment of the images.

Regardless of all these variables, the angle is always very small for objects closer than 40 feet and the differences between both images difficult to discern; despite the physical separation of the image centres, high quality resolution equipment is essential.

As a guide it has been found that this angle of view is less than one quarter of a degree for objects at less than forty feet.

The importance of this discovery is that in combination with another discovery and another improvement of another invention this very small angle of displacement can be increased in a flexible way that permits application to most conventional imagery equipment.

In essence this is accomplished by applying a system of variable separation to the two different images and altering the degree of separation as required.

Like other aspects of three-dimensional imagery, it has been known for more than a century that three-dimensional imagery can be produced by segmenting left and right angles of view of an object and arranging the strips on a flat surface separated by slats, or similar dividers, so that observers can position their eyes to have the left eyes seeing left image strips while the slats block the left eye views of the right image strips and the right eyes see the right image strips, while the slats block the right eye views of the left image strips.

This well known arrangement produces a three-dimensional combination but is always limited by the degradation to the overall effect caused by the view differentiating slats.

Another approach was demonstrated by Francois Savoye in the early 1950's, when he produced and applied for a patent for his "Cyclostereoscope".

The cyclostereoscope comprises a circular grid rotating about a screen on to which left and right adjacent angles of view were projected through the grid.

The concept, described by Savoye, envisaged transposing the approach of view separating visors, worn around the eyes of viewers, to a similarly functioning arrangement operating around the screen.

Savoye envisaged the grid, alternatively blocking each eye view of a different combination of strips of angles of view and the whole grid rotating to sequentially reveal all segments at a speed that would permit memory and vision to together perceive the strips combined as two whole images in three dimensions.

This Savoye achieved partially and prescribed zoned seating arrangements to confine viewers to areas where three-dimensional views were optimised and views of two overlapping images minimised.

An improved grid viewing system is an exclusive feature of this invention which overcomes the zonal problems of the Savoye idea as well a dispensing with the limitations of a rotating, circular grid.

It is a second discovery of this invention that images containing two, or more, adjacent angles of view acquired around the common centre of essentially the same object can be aligned in three complete, and coherent, dimensions, except the extreme outer edges, in increasing divergence of angle, with increasing separation between the different images, and the corresponding viewing eyes.

In practice, it is necessary to segment and separate the images sequentially so that an equal number of equally sized and equally spaced images are presented on a screen and then viewed through a vertical grid so that left eye views of image segments left of the common object centre are separated from right eye views of image segments right of the common centre in increasing degrees of exclusion as the angles of divergence between the images increase.

As a guide, the system applied to two or adjacent angles of views acquired around a common centre of an object, where the centre of each different view are horizontally separated from approximately a quarter of an inch to five inches for any two adjacent angles of view.

For extreme close-up views or views beyond visual infinity, these positions will be lesser or greater.

To maintain this relationship in a way that overcomes the limitation of a rotating, circular grid, or the inertial forces of an oscillating mechanical grid, the grid system can be supplied by grids formed with a liquid crystal display synchronised with the segmentation of the imagery.

To produce a complete three-dimensional imagery and remove the appearance of grid lines degrading the imagery, the segmented and separated imagery, enhanced in separation by the grids, can be oscillated together in synchronisation so that their functions are maintained at a speed, for example in excess of fifty hertz, where the segments merge into a complete, coherent, three dimensional image and the grid lines are oscillating too fast to be seen.

This combination produces zone-free three-dimensional imagery of any angle capable of human perception by widening or narrowing the grid lines, without inertial limitations, or incompatibility with almost all conventional equipment.

Up until this time, three dimensional imagery has been created and viewed as what could be termed, "the two separate views" type. This can be done through spectacles, known means and apparatus and the like. Essentially however three-dimensional imagery of the "two separate views" type involving separate right- and left-hand views and the sequential blocking off of these views, is not capable of producing visual realism as people are used to experiencing it. In other words, as the eyes normally communicate the views to the brain. Such three-dimensional imagery tends to be identifiable as imagery and thus unnatural. Further, there are other drawbacks with such known forms of three-dimensional imagery, including for example limitations on the angles from which imagery can be seen, incompatibility with conventional equipment, difficulties with transmission and broadcasting, substandard qualities, eye strain and lack of commercial viability and reality, as well as problems with many people who have abnormal vision.

As a background of the present invention, and for the purposes of the description and definition herein, it is generally believed that it can be said that the eye should in many cases be conceived as something of a dynamic sensor. The eyes of a human being generally see both horizontal and vertical planes substantially simultaneously, together with constantly varying fields of depth and focal points. This essential dynamic sensing, coupled with the memory, maintains impressions of infinitely variable views of everything seen by the eyes. It is generally believed that the mind is not given one clear left or one clear right view, but is continually given a range of different partial and adjacent images. These varying partial and adjacent images are combined by the mind or brain of a human being into a single coherent whole which has depth of image and which clearly appears in three dimensions.

It is also generally believed that the eyes of a human are rapidly and continuously scanning. As indicated, they do not, it is believed, continuously focus on one point, giving one right view and one left view. The eyes have a continuously changing field of view and both eyes are continuously shifting over varying points, one crossing over the other's field of view. Further, humans are often continuously moving their heads, and eye balls are often moving within their sockets. Thus, far from the mind or brain of a human having transmitted to it, two dissimilar changing views or photographs (one right and one left), what the mind or brain is receiving is continuous partial and adjacent, segmented and separated views of imagery.

Up until this time, it is believed that the opticals using the principle of producing two distinct views to simulate the perceptions of three dimensions are limited by inherent restrictions. Such restrictions confine such systems and means to representations of three dimensions in single horizontal planes with fixed field depth and fixed focal length. It will be appreciated from the above that these are not realistic, and are perceived as such. In practice, such known systems are precluded from reproducing realistic three-dimensional imagery.

A fundamental feature of the present invention is that it produces a commercially viable method for producing three-dimensional imagery, by removing the necessity for wearing view differentiating spectacles and for using other intermediate opticals between the imagery and the observer.

The present invention, in its preferred forms, accomplishes the production of wide angle three-dimensional imagery, with comparatively little alteration and addition to existing technology, by containing about a common centre within each image, multiple, adjacent angles of view that are displayed partially and progressively across the screen, in apparent full alignment, as separated image segments, or as a combination of separated image segments, changing to cumulatively reveal the continuously varying spatial displacements between the segments of images on the screen and, at sufficient speed, as constant visual displacements between the subject elements of a steady, single, coherent and complete three-dimensional image.

The present invention also provides that the angles between the multiple views about a common centre of each image are such that the rapidly changing segments of images containing the angles produce an apparent constant visual displacement between the subject elements of the image, at the same time that the subject elements within the image appear to remain in alignment, so as to prevent or minimise the appearance of more than one image, or multiple imagery within any part of the image.

The term "production" means acquisition, generation or construction for immediate display upon a screen, or immediate transmission for display, or immediate broadcasting for display. In addition, "production" can mean acquisition, generation, or construction for storage and later display, transmission, broadcasting or projection.

Equipment used for acquisition includes cameras, cine cameras, video cameras, holographic camera arrangements, or any device capable of acquiring imaging containing multiple, adjacent angles of view about a common centre in a manner such that the acquired imagery can be presented, separated and segmented for display so as to appear three-dimensional on a screen.

Segmentation of the multiple adjacent angles of view about a common centre can take place as the imagery is acquired, within a camera-like system, or anywhere before display such as during, or as part of, film processing; storage input or retrieval; or editing; for the production of slides; film prints or video tapes for release; in transmission or broadcasting; or on reception.

In addition, appropriate segmented imagery can be manufactured in the generation of imagery, such as computer imagery or symbology, or in the production of caricatures.

By "image" a single whole image is meant such as contained by a slide; one frame of a film; one image on a video tape; an x-ray; or any other clearly definable view capable of being recorded, stored, transmitted, broadcast, displayed, projected, presented or generated to duplicate actual objects, symbols; or represent objects or symbols such as computer generated imagery or caricatures. In addition, by image or imagery, series of single images presenting the same view or continuation of a view are included.

By display is meant projected, presented, illuminated or generated so as to be visible to the eye.

By screen is meant any surface upon which the imagery can be displayed, presented, projected or generated so that it becomes visible; or any volume in which imagery can be made to appear.

By alignment is meant that each imagery is registered apparently exactly upon any other in size, shape, vertical and horizontal position, so that multiple images appear as differing only in the appearance of depth or dimensionality and never as more than one image, or more than one part of any image, necessarily the same shape, that is revealed progressively across the screen.

In practice the size of the segments will vary according to the medium used for acquisition or viewing.

The present invention provides a method and arrangement, whereby imagery is recorded in such a manner that realistic and commercially viable three-dimensional imagery can be subsequently, or substantially simultaneously, be shown on a screen surface. The imagery can be recorded on any appropriate media, such as film, tape, slides, holograms and the like. In one form of the invention the imagery is recorded on media so that it can be subsequently shown such as in the cinema by way of slides or photographs, on a television, on a video set and the like. In further forms of the invention, means for recording the imagery, such as a camera or cameras, are in the form of a camera or cameras which are themselves, or in conjunction with appropriate transmission means, able to immediately transmit the recorded imagery to means such as television sets and the like which will receive and show the recorded imagery on a screen surface. For example, such as television cameras used in outside broadcast units for television news, sporting events and the like. These are by way of example only. Thus, it should be appreciated that the present invention relates to a method and arrangement for the recording of imagery for subsequent or substantially simultaneous viewing on a screen surface. The present invention does not relate to a method and arrangement for enabling previously recorded imagery to be viewed on a screen so as to appear in three dimensions.

The method and arrangement of the present invention require the provision of a lens or lens system, that allows for the recording or acquisition of two or more substantially adjacent, similarly sized angles of view of imagery or objects that are to be recorded. Generally, it is better to acquire or record a plurality of smaller adjacent angle views rather than a smaller number of larger angle views. It should however be appreciated that in the present invention it is essential that two or more differing angles of view be recorded.

In addition, it is a further feature of the present invention that the imagery be recorded for subsequent or simultaneous viewing so that at all times only partial and adjacent sections of each angle of view are acquired or recorded. As will be appreciated, this means that when the imagery is displayed, none of the multiple angles of view appear to the eyes completely at any one instant, but rather are revealed only as a sequence of segments, at a speed to the eye which merges the segments together at differing angles, so that when viewed, the recorded imagery is perceived by the eyes to have depth in imagery and to be in three dimensions; that is, in accordance with the normal working or operation of the eyes of a human.

In one preferred form of the present invention the partial and adjacent angles of view are recorded in a non-sequential manner, by using the apparatus and method of the present invention. The recording of such non-sequential adjacent and partial angles of view, in accordance with the present invention, allows for such non-sequential adjacent and partial angles of view to be subsequently shown by means of the present invention so as to be viewed with depth of imagery and in substantially three dimensions, by the eyes of a viewer.

The present invention provides that means be provided in association with the lens or camera, or in association with the recording of a multiple angle views, so that the imagery is recorded in a partial, adjacent and spaced apart manner. To that end, the invention requires the provision of a grid, grid system, separator, angle of view interrupter, light or signal blocking mechanism, switch or process means, as a component or feature, essential to the recording of the imagery, so that the imagery as recorded, is recorded partially and from two or more spaced apart, adjacent angles of view.

The present invention is described with reference to the imagery being recorded from two spaced angles of view—one left angle and the other a right angle. This is however, by way of example only and it should be appreciated that the imagery can be recorded from two or more angles of view.

The means for use in recording partial and adjacent multiple angles of view can be separate from the recording means such as a camera or can be incorporated into the camera. Various forms of the invention will be described hereinafter by way of example only and with reference to the accompanying drawings, but it should be appreciated that these are by way of example only. For example, a camera can have included into it appropriate means for causing the imagery to be partial and adjacent, such a means being in the form of for example an interrupter, such as a grid system which can be built into the camera but arranged so as to avoid interference with the shutter or scanning function. Further, any such arrangement should be timed to obviate as far as possible the production of lines, strobing, moire or other optical noise, distortion or image degradation.

It is however envisaged that in one form a camera can be an electronic camera which can be programmed so that it can record partial and adjacent angles of view of the article or articles being recorded. Such a camera can have a plurality of spaced lenses, or alternatively a plurality of such cameras can be utilised, the recorded imagery thereafter being mixed and processed.

In forms of the invention where an interrupter or grid arrangement might be provided within the camera, such an arrangement can be provided before, within or behind the lens or in any position wherein it positively interrupts the acquisition or recording of imagery, through the lens, so that only partial and adjacent images are recorded on the media or recorded by the camera.

It is envisaged that when such an arrangement is incorporated into a camera, the grid or interrupter arrangement will be preferably placed behind a lens, adjacent and as close as possible to the film plane and will be synchronised with the camera shutter or might replace the shutter or be incorporated into the film gate.

In various forms of the invention, where a plurality of angles of view have been acquired and recorded by films or electronically, the recorded multiple angles of view can then be subsequently altered so as to include partial and adjacent angles of view, such as by known mechanical, electro-optical, electrical, or other means, such as for example segmentation mixes and the like.

It is further envisaged that media, such as film or tapes, with a programmed grid or pattern applied thereto, or gaps therein, could be used in a camera to simplify the recording componentry. In yet a further form of the invention it is envisaged that display units presenting image interrupting patterns could be used to mix multiple angle views. For example, a liquid crystal display could be used that presented image segmenting lines or gaps traversing the display of the required speed, to form a dynamic optical grid.

The invention will now be further described with reference to preferred embodiments thereof, and with reference to the accompanying drawings (as referred to hereinbefore).

In a preferred form of the invention the imagery is shown on a screen, as a result of being computer-generated or produced on a screen, or by being displayed on a screen by way of protection. In the accompanying drawings, by way of example only, the imagery is shown as being viewed through the grid means—(to be described further hereinafter).

The screen 1 is shown as having a screen surface 2 and grid means is provided substantially in front of and spaced apart from said screen surface 2, the grid means 3 preferably being in the form of a liquid crystal display screen, which on operation generates a plurality of oscillating grid sections 4, through which the imagery can be viewed on the screen. Other forms of grids can be used if desired. For example, physical grids extending across the front of a screen, provided with a plurality of slots or openings 4 thereof of varying depth. It is however preferred that the grid means have a plurality of grid sections or openings therein and is preferred that the grid means 3 be in the form of a liquid crystal display screen or other appropriate electrical or chemical optical arrangement which provides physical separation of imagery.

The liquid crystal display screen is preferably arranged so that the grid 3 oscillates to meet the requirements of the present invention. In other forms of the invention, grid means can move or oscillate by means of additional mechanisms or electric power means.

By way of example only and referring to FIG. 1 of the accompanying drawings, the grid 3 is shown as being separated forwardly from the screen surface 2 and one form of the invention is shown (diagrammatically) as being embodied into a housing or cover 9 in front of the screen 1, be it a screen of a television set, a cinema screen or the like.

Figure 2:
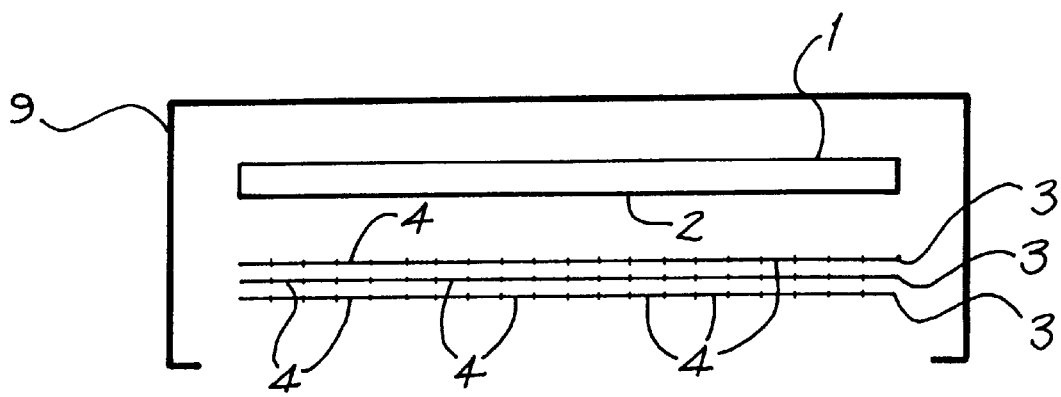

In a further form of the invention as shown by way of example only with reference to FIG. 2 of the drawings, a plurality of spaced apart grid means 3 can be provided to form channel sections or slots 4 therebetween so that on oscillation or movement thereof, imagery on the screen surface 2 will be seen therethrough in three dimensions.

As with other forms of the invention, the screen 1 and spaced-apart grid means 3 can be located or housed in a housing 9 so as to be substantially integral. Alternatively, they can be separate one from the other.

It will be appreciated that at least the grid means 3 can be for example in the form of crystalline, liquid crystal or similarly functioning electro-optical materials.

For use, in forming an appropriate grid or surface, the materials may for example be inorganic compounds, such as gilenium arsenide; lithium niobate; potassium dihydrogen phosphate; and barium borate; as well as organic compounds such as methyl nitroaniline and nitroaminostilbene; also materials from electron donors, such as amino, methoxy, and hydroxy groups; and electron acceptor groups, such as nitro, cyanide, esther and nitroso groups; polymers; polyenes; and polydiacetglenes or any materials with electro-optical properties; light frequency changing properties; non-centrosymmetric molecular structure; or crystalline structures where anions have been completed replaced by electrons, such as in complex compounds, such as alklide, potassium hexamethyl hyxacyclen sodium. The elctro-optical material may be arranged in single pieces such as blocks, slabs or chips, or in a number of pieces, in large or small pieces of any shape, in films, in thin films, in solutions, in suspensions, sandwiched between other materials, such as glass, as mixtures with other electro-optical compounds, or as mixtures with other materials that are non-electro-optical compounds.

Where for example the electro-optical materials of the grid are arranged in lines, rods, strips, slats, panels or filaments, these can be positioned in rows, in partial rows, staggered rows, in parallel, in parallel rows, in horizontal or vertical rows (or both) or in intersecting rows. Further, they may be of differing lengths and sizes and at different positions within the display.

As indicated, these are by way of example only and grids such as grids formed of any appropriate material with slots therein, adapted to oscillate in an appropriate manner, can be used to meet the requirements of the present invention.

In practice, the apparatus for producing a coherent three dimensional imagery works in the following way. The grid which comprises alternate slats and openings is set at a predetermined distance from the screen on which imagery is projected from two or more angles of view. When an observer sees the screen through the openings in the grid he observes segments of the imagery commensurate in dimension with the size of the openings in the grid. The alternate slats at the same time block some segments of the imagery from view. Thus, alternately the observer sees with each eye only part of the whole image. In order to enable the observer to view three dimensional imagery the grid is oscillated at a predetermined frequency preferably within the range of 50 Hz to 450 Hz depending upon requirements such as screen and thus grid size. The screen thus during oscillation continuously moves between a first position and a second position and it is the movement from the first position to the second position which exposes the whole image to the observer albeit alternately and in accordance with the description below.

When the grid is in the first position, the observer's left eye sees via the openings in the grid part of the whole image left of a common centre. At that position of the grid part of the image left of the common centre is blocked to the left eye. The right eye sees part of the whole image right of a common centre but part of the image is blocked to the right eye. When the grid is shifted momentarily to the second position before returning to the first position, the left eye of the observer sees that part of the image left of the common centre which was blocked from view to the left eye when the grid was in the first position and no longer sees that remaining part of the image which was visible left of the common centre when the grid was in the first position and the right eye of the observer sees that part of the image right of the common centre which was blocked from view to the right eye when the grid was in the first position and no longer sees that remaining part of the image which was visible to the right eye right of the common centre when the grid was in the first position. To avoid alternate obscuring of part of the image the grid is oscillated at such speed that it appears invisible to the observer enabling the viewing of coherent three dimensional imagery by alternate observation of part of the image when the grid is in the first position and the remaining part of the image when the grid is in the second position.

As both the grid and left and right image segments alternately appear alternating displayed positions on the screen at each movement so that no two different segments of imagery acquired left of the common object centre are displayed in identical positions at any time and so that no two different segments of imagery acquired right of the common object centre are displayed in the same position at any time. Thus, the segmented images that the left and right eyes see alternately, are all seen in different positions.

As will be appreciated, in operation, the present invention allows for the display of three-dimensional imagery and the viewing of three-dimensional imagery (be it generated, produced or projected) such as in the manner described and claimed in our international patent application No. PCT/AU92/00199. Thus, the imagery projected onto the screen or generated onto a screen or shown on a screen otherwise, involves displaying imagery on a screen which imagery includes two or more spaced apart adjacent angles of view about a common centre which are displayed and in a segmented and separated manner, substantially sequentially or alternately on a screen. The separated segments are viewed through sections of a grid, such as described with reference to FIGS. 1 and 2 of the accompanying drawings, which have sections or openings of a size and shape corresponding substantially to the dimensions of the segments of imagery displayed on the screen. The grid means is placed at a distance from the screen, such that the segments of imagery acquired left of a common image centre are seen through grid sections only by substantially the left eye of a viewer, while image sections acquired right of a common image centre are seen through grid sections substantially through the right eye of a viewer.

The relationship between the left and right segments of imagery, relative to the grid and sections thereof is substantially maintained when the grid sections oscillate, to enable the imagery to be viewed through the oscillating grid, the oscillation being at a speed and in synchronisation with the display of the segments of imagery, such ta the imagery appears to the eyes of a viewer (through said grid means) to be coherent, complete and in three dimensions. It has been found that this avoids flickering, whole or partial appearance of any individual angles of view and it has also been found that the grid sections, on oscillating, become substantially invisible as a substantially transparent window between the eyes of a viewer and the screen.

In further explanation of the present invention, it is based on a dynamic electro-optical arrangement as are many other known methods of producing three-dimensional imagery. Such prior inventions have, however, fallen short of the mark. One important aspect of the present invention is that it overcomes the well known limitations inherent in grid systems.

In particular, the present invention displays three dimensional imagery on a screen that can be seen by the unaided eyes from a large viewing arc. Limitations on the viewing arc are determined by the limitations of various display systems on which the imagery may be presented. Some of these systems have no limitations, such as films, while others are limited according to cost or inherent system function. There are, however, no limitations inherent in the system of the present invention and current technical limitations are constantly being reduced by price reductions, higher equipment operation speeds and increases in viewing angles of components like liquid crystals.

If it can be appreciated that to display three dimensional imagery, of the type elaborated at length under the heading "DESCRIPTION OF THE RELATED ART", it is required that at least two views be displayed, then the most fundamental aspect of the invention can be grasped. This means that two whole views, of the same size and shape, have to be displayed on the same screen at the same time, each of these views filling the screen. In other words, two different views, one for the left eye, one for the right eye, are displayed exactly on top of each other but are separated from each other through a viewing arrangement that permits the two completely superimposed pictures to be seen exclusively by each appropriate eye. This is the nub of the invention.

The way in which the two different pictures are presented to the left and right eyes involves the application of a dynamic grid, which can scan across the screen, oscillate across the screen, and may do so either vertically or at forty-five degree angles, switching from left and right of the vertical. The use of such grids has been known for at least three hundred years and they are generally called "parallax barriers".

When such grids are placed in front of a displaying screen, the grid forces the eyes to look through openings in the grid. In such an arrangement, two effects follow:

1. Because the eyes are in different positions in the head, each eye sees a different view through the grid because it is looking through the grid from a different position and from a different angle.

2. Because the grid is composed of open sections that can be looked through and grid segments that cannot be looked through, the grid segments will not only force both eyes to see different parts of whatever is displayed on the screen, the grid will also block different parts of whatever is displayed on the screen. Furthermore, because the grid sections are in different positions for each eye, the blocking effect will be different for each eye.

The grid arrangement is used in the present invention to separate the two views that appear on the display screen. For this to happen it is clear that if either the left or the right view was displayed at any one time and viewed through the grid then either eye would see only half of the total image displayed on the screen. This is because each eye can see through only half of the grid spaces at any one time.

If the grid is to be used, as is the case in this invention, to separate two different views, to each appropriate eye, then the following is required:

1. Views intended for the left eye must be positioned on the screen behind the grid to be seen through the sections through which the left eye is not obstructed.

2. Views for the right eye must be positioned on the screen behind the grid to be seen through the sections through which the right eye is not obstructed.

Such an arrangement will have two inevitable features:

1. Only half of either the right or left view can be displayed at any one time because only half of the grid is available to each eye at any one time.

2. Because the position of the eyes in the head see half of each view in separated positions through the grid, the left and right views seen through the grid will be seen in alternating positions through the grid as illustrated in FIG. 1.

For the complete view to be seen two different things must happen:

1. The grid must move into a second position to allow the second halves of each view to be presented on the screen in another position where these second halves can be seen.

2. The second halves of the two views must be presented on the screen in a different position from the first position. This second position corresponds to the second position of the grid so that left views are presented to left eyes and right views are presented to right eyes. (If the positions of the second halves of the two views did not reverse with the grid changing positions, then the left views would be seen by right eyes and right views by left eyes.)

In short, the present invention involves a system which presents half of each view, extended right across the screen, in alternating positions. Each half view is seen through a grid to effect the required separation of appropriate views to appropriate eyes. Moving the grid gives a new viewing position for each eye which is the reverse of the previous viewing position so that the remaining two half views displayed on the screen must also be reversed in their alternating positions so as to match the reversed viewing positions.

In other words:

THE ALTERNATING SEGMENTS OF LEFT ANGLES OF VIEW FOR LEFT EYES AND RIGHT ANGLES OF VIEW FOR RIGHT EYES WILL ALTERNATE IN SYNCHRONISATION WITH THE OSCILLATION OF THE GRID.

Precise alignment of the grid elements with the image segments is essential to the effective separation of the left image segments to left eyes and right image segments to right eyes. As well as separating the image segments effectively to each eye, the alignment must reveal the entire left and right images sequentially in two halves so as to display each picture completely to each eye.

This requirement to completely separate and completely reveal the two complete views has been the dilemma of known optical grid systems because it is not possible in any two movements of the grid to obscure each view totally from the wrong eye and at the same time reveal each view totally to the correct eye. In practice, to achieve complete separation, the grid has to obscure more of each image than it reveals at each movement. Thus it cannot achieve full display of each image in any one cycle of two movements that combine two halves of each view in alternating segments. Consequently, in the preferred embodiment of the present invention, the grid segments have to be repositioned in another position and the images scanned in again from a different viewpoint that includes the parts of the imagery not seen in the first cycle. In practice this means the minimum cycle speed of the system of the present invention is 180 hertz to achieve a flicker free assemblage of two complete image views over four cycles.

In practice, the grid lines will be positioned approximately half way between each alternate image segment as shown in FIG. 2. Biasing the position of the grid to better expose one view to one eye while better obscuring the other view and alternating the bias is a option to be used depending on the speed of the display system and the viewing angle required. As well, alternately changing the relative sizes of the image segments in relation to the grid sizes may be employed for the same reasons.

The size of the grid elements and the relative size of the image segments can be varied, or alternated, as required for different viewing positions as well as the position of the grid elements from the screen.

AT ALL TIMES THE LIMITATIONS OF THE SYSTEM ARE CONSTRAINED BUT ONLY CONSTRAINED BY THE SPEED OF THE ALTERNATE IMAGE SEGMENTS ALTERNATION IN SYNCHRONISATION WITH THE GRID OSCILLATION.

An infinite number of grid positions, grid and image segment sizes can be displayed to an infinite number of viewing positions limited only by the speed of the system, to provide such viewing positions at a speed that does not product flicker and displays both images completely and separately at those positions.

More than two images can be displayed using any section of the image segments to display another angle of view.

This description of the present invention may be even further enhanced by the use of a number of the drawings appended hereto.

FIGS. 3–17 show the present invention when used to display images acquired from two viewpoints.

FIGS. 18–24 show the present invention when used to display images acquired from more than two viewpoints.

Figure 3:
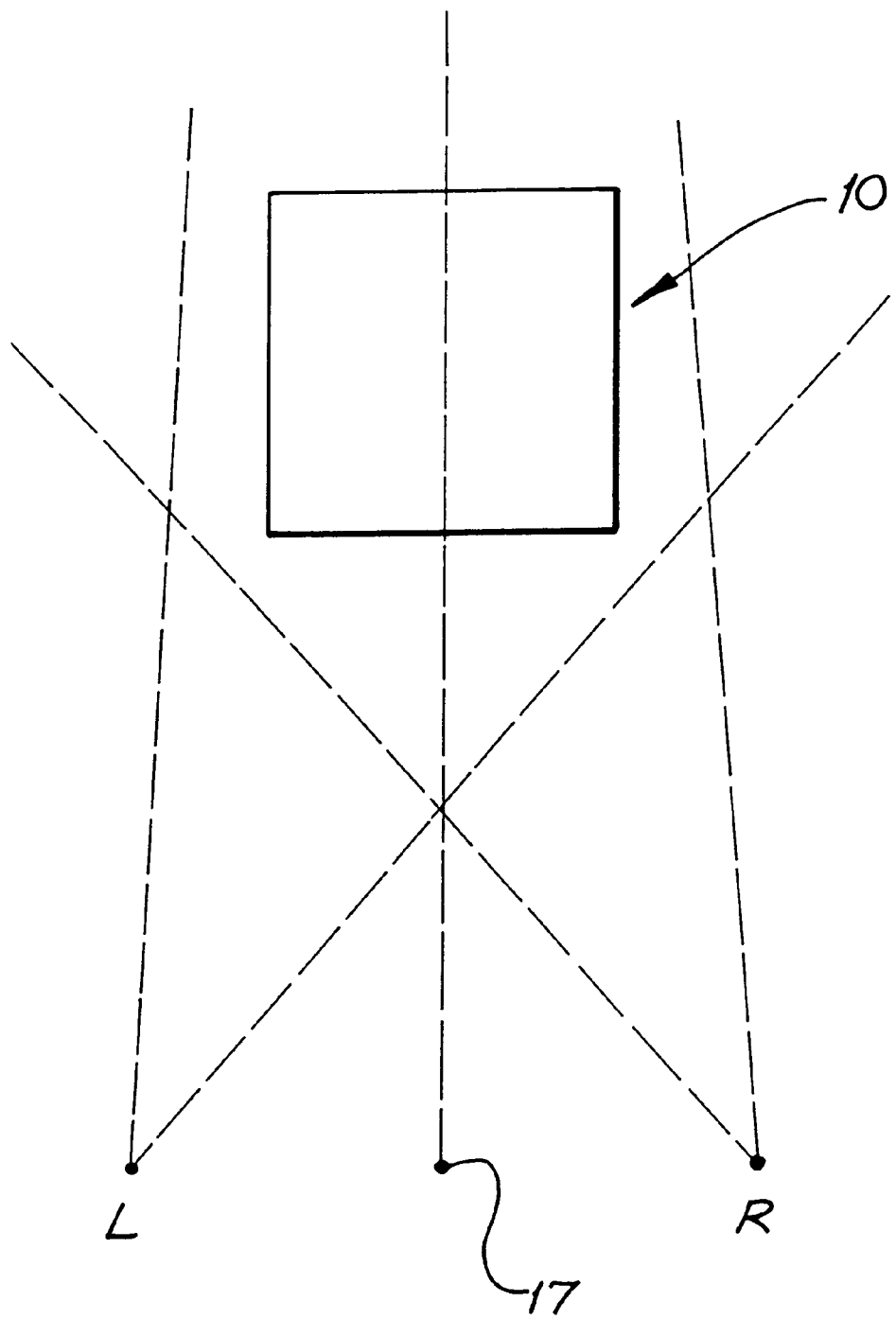
FIG. 3 is a top-view of a chair showing a left viewpoint and a right viewpoint.

Looking firstly at FIG. 3, there is shown a chair (10) as seen from above. L represents a viewing position slightly to the left of a central point (17). R represents a viewing point slightly to the right of central point (17).

Figure 4:
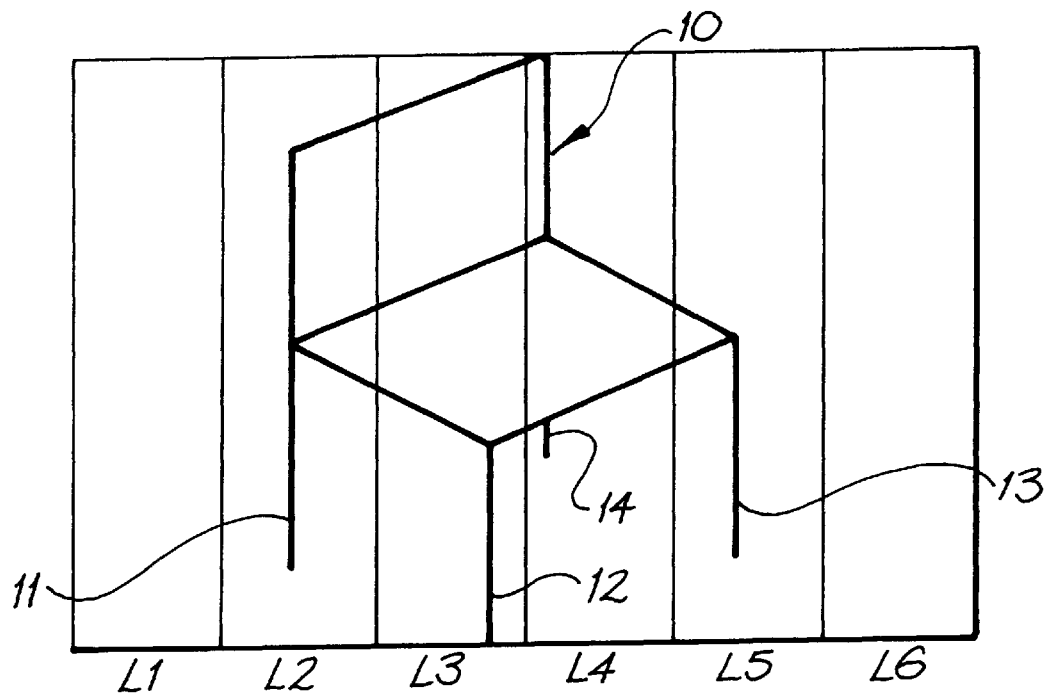
FIG. 4 shows the six image segments L1 to L6 showing the chair as seen from a left view L.

FIG. 4 shows the chair as it would be seen from viewpoint L. If the whole angle of view was displayed on a screen, in six segments, the screen would appear as shown in FIG. 4. To more readily identify the parts of the chair, its legs have been labelled as 11, 12, 13 and 14. Image segments L1 to L6, acquired from point of view L will be referred to as "left image segments".

Figure 5:
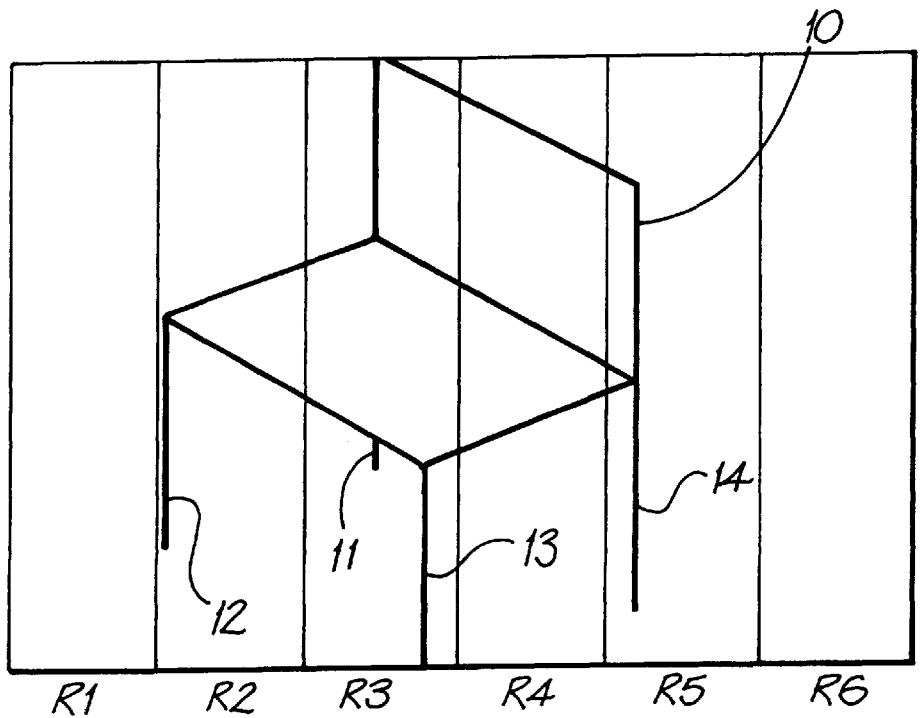
FIG. 5 shows the six image segments R1 to R6 showing the same chair as seen from a right view R.

FIG. 5 shows the chair (10) as seen from viewing position R. If the whole angle of view was displayed on a screen, in six segments, the screen would appear as shown in FIG. 5. Image segments R1 to R6, acquired from point of view R will be referred to as "right image segments".

Figure 6:
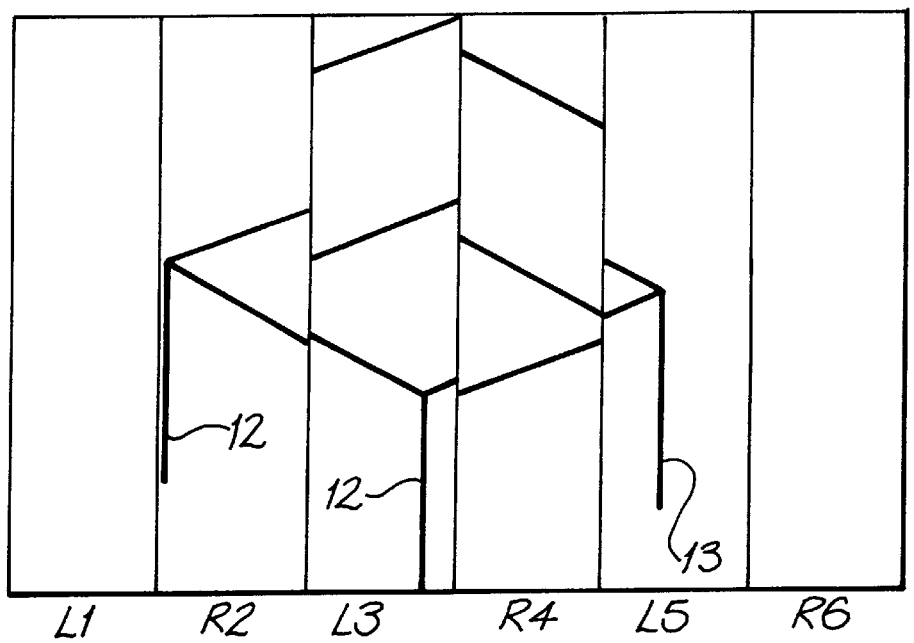
FIG. 6 shows the interleaved left and right screen image segments in a first position.
Figure 7:
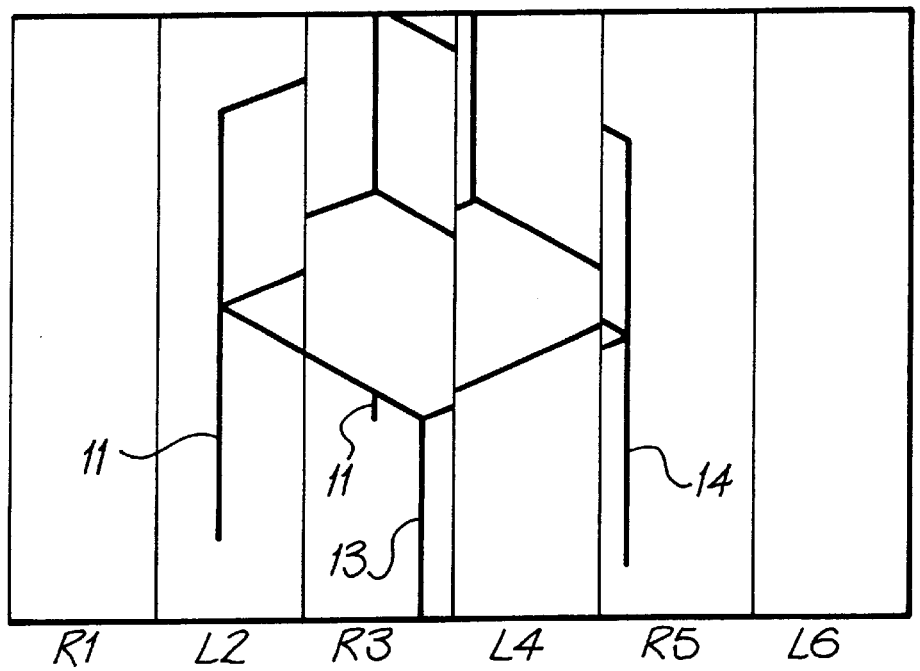
FIG. 7 shows the interleaved left and right screen image segments in a second position.

In order for the present invention to work, image segments must be displayed on the screen in a first position and then in a second position. FIG. 6 shows a screen in the first position with left and right image segments interleaved with one another. FIG. 7 shows the screen displaying the left and right image segments in a second position.

Figure 8:
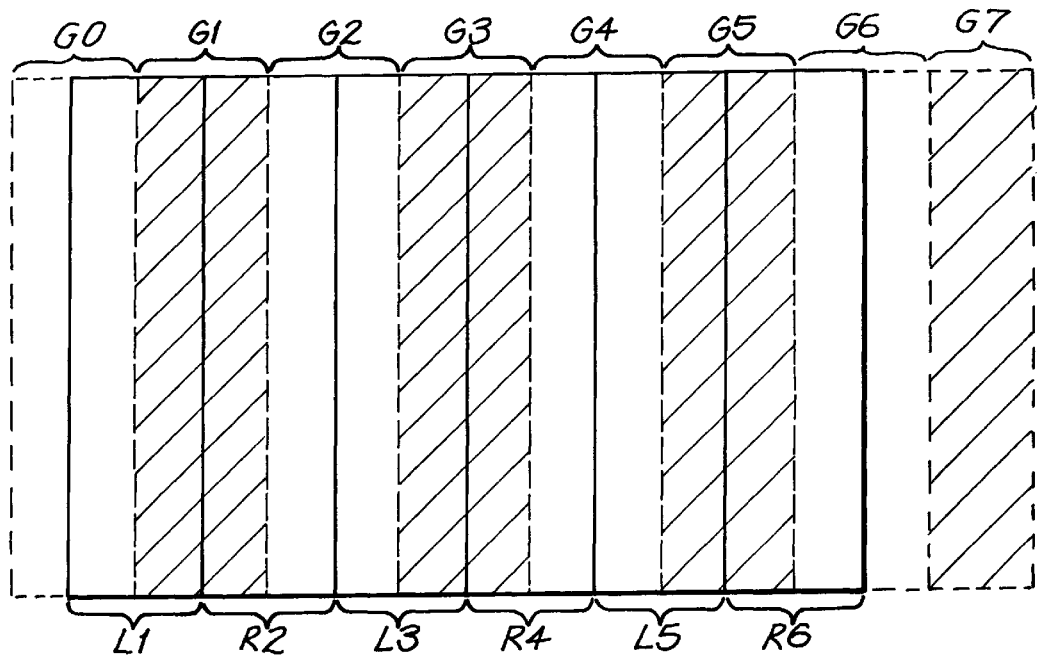
FIG. 8 shows the actual positions of the grid segments in front of the image segments on the screen shown in FIG. 6.

When an LCD grid is placed in front of the screen, it is aligned with the image segments on the screen in such a way that the left eye can only see left image segments and the right eye can only see right image segments. FIG. 8 shows the actual positions of the grid segments in front of the image segments on the screen shown in FIG. 6. (However, this is not how it appears to the eyes.)

Figure 9:
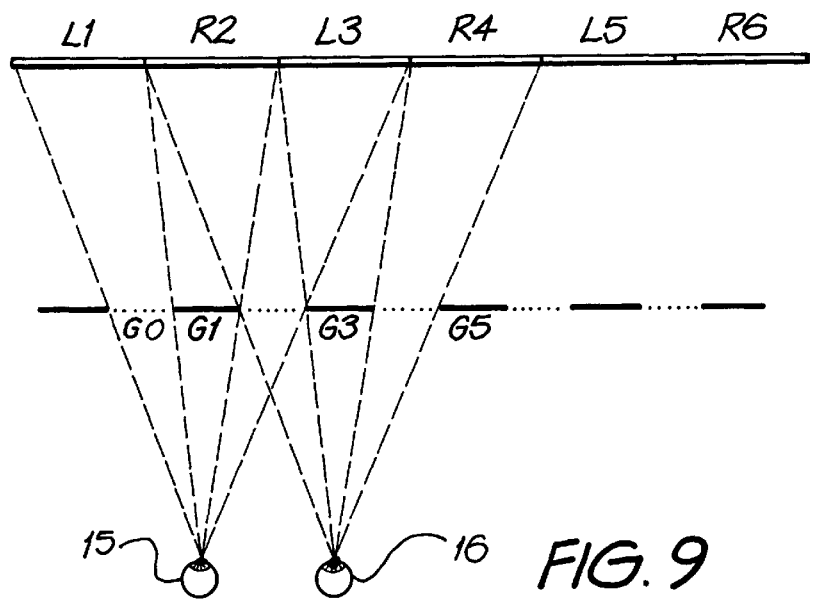
FIG. 9 is a plan view of two eyeballs viewing the screen through spaces in the grid.

FIG. 9 shows a plan view of the screen in a first position where the image segments are as shown in FIG. 6, and of a grid having grid segments G0, G1 . . . G7 placed between the screen and a viewer. The viewer has a left eye (15) and right eye (16). The position of the grid segments in relation to the viewer's eyes and the screen segments is such that the left eye (15) can only see left image segments L1 and L3, and the right eye (16) can only see right image segments R2 and R4. This is by way of example only and, in practice, the left eye (15) would see a myriad of left image segments and the right eye (16) would see a myriad of right image segments.

Figure 10:
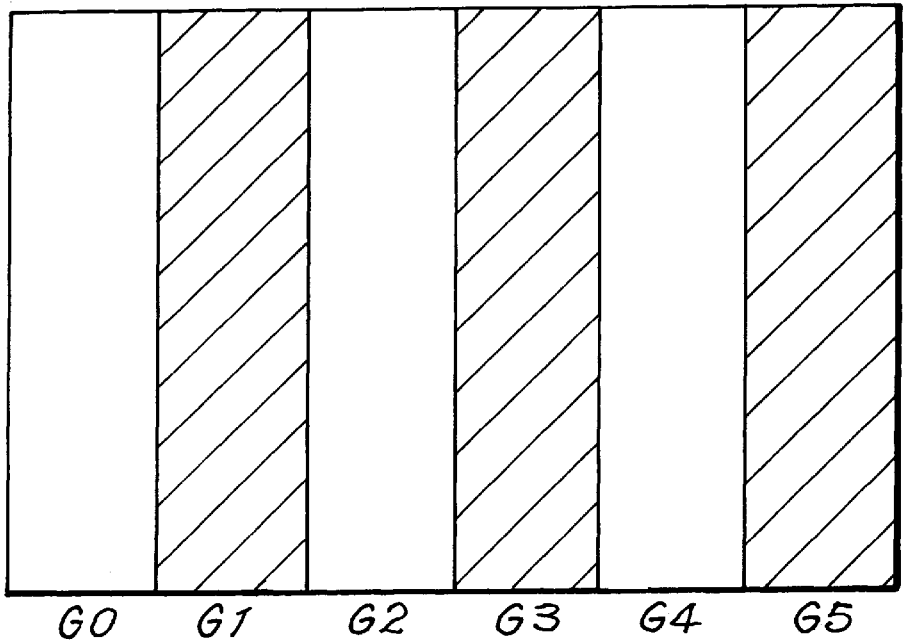
FIG. 10 shows the grid segments in a first position as they would be seen by the left eye of a viewer.

FIG. 10 shows the grid segments of FIG. 8 in a first position as the grid segments would be seen by the left eye of the viewer. When the grid segments are in a first position, the image segments are as shown in FIG. 6. The cross hatched segments indicate the grid segments that the viewer can not see through. Correspondingly, the unshaded segments are the grid segments that the viewer can see through.

Figure 11:
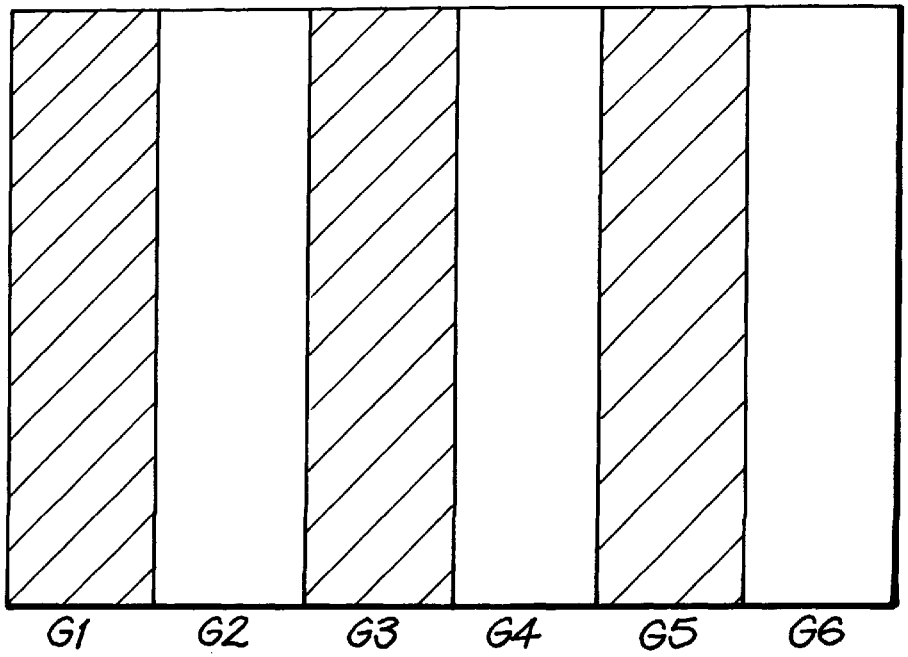
FIG. 11 shows the grid segments in a second position as they would be seen by the left eye of a viewer.

FIG. 11 shows the grid segments of FIG. 8 in a second position as the grid segments would be seen by the left eye of the viewer. When the grid segments are in a second position, the image segments are as shown in FIG. 7.

Figure 12:
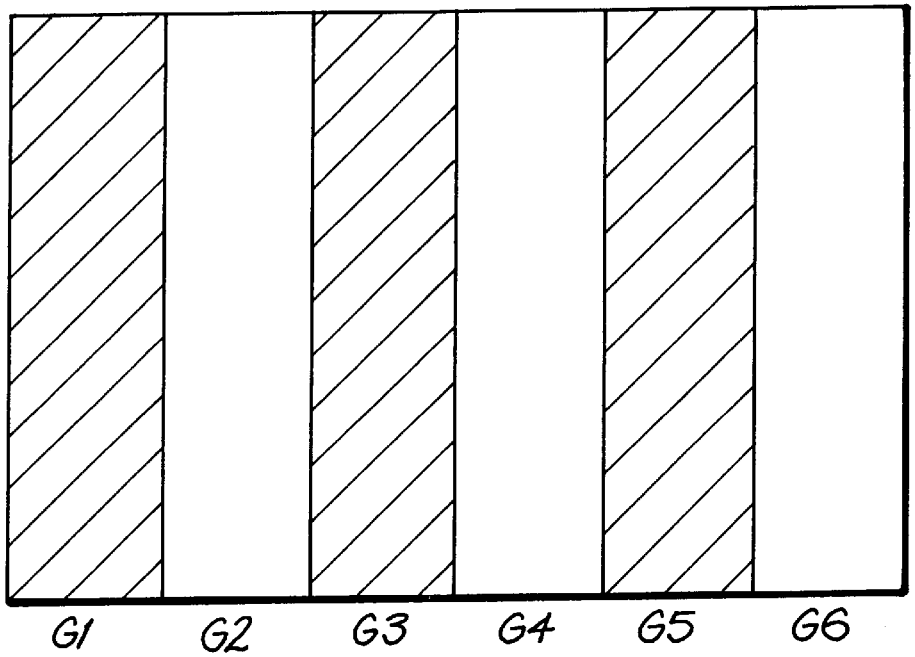
FIG. 12 shows the grid segments in a first position as they would be seen by the right eye of a viewer.

FIG. 12 shows the grid segments of FIG. 8 in a first position as the grid segments would be seen by the right eye of the viewer.

Figure 13:
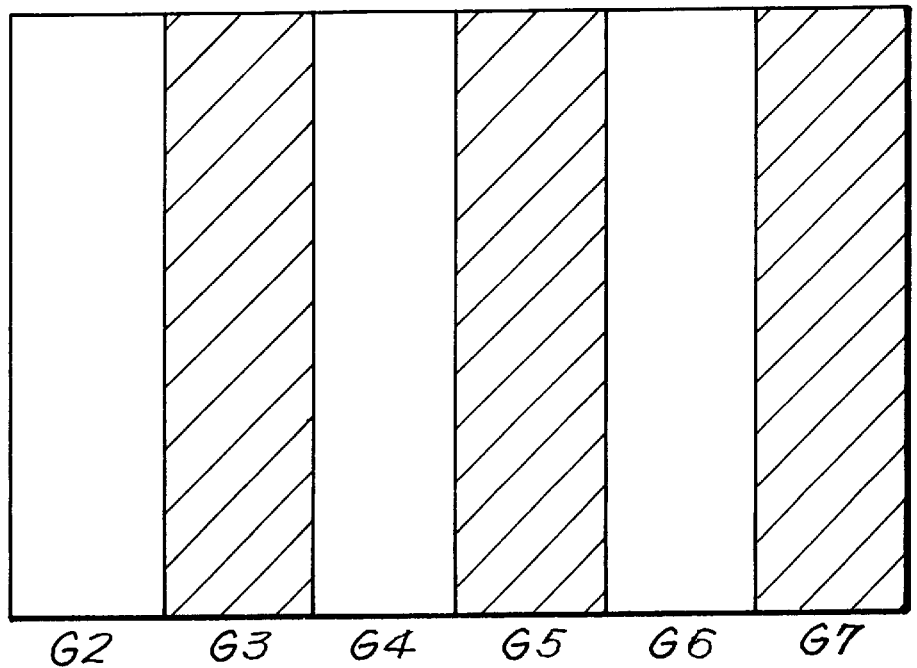
FIG. 13 shows the grid segments in a second position as they would be seen by the right eye of a viewer.

FIG. 13 shows the grid segments of FIG. 8 in a second position as the grid segments would be seen by the right eye of the viewer.

Figure 14:
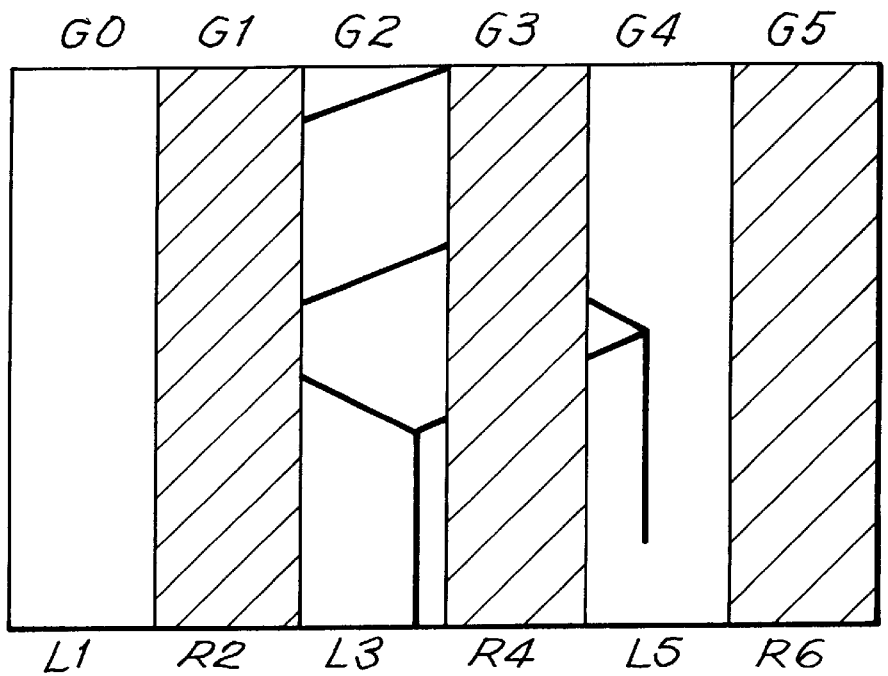
FIG. 14 shows the grid segments in a first position placed in front of the screen; showing image segments in a first position as seen by the left eye of a viewer.
Figure 15:
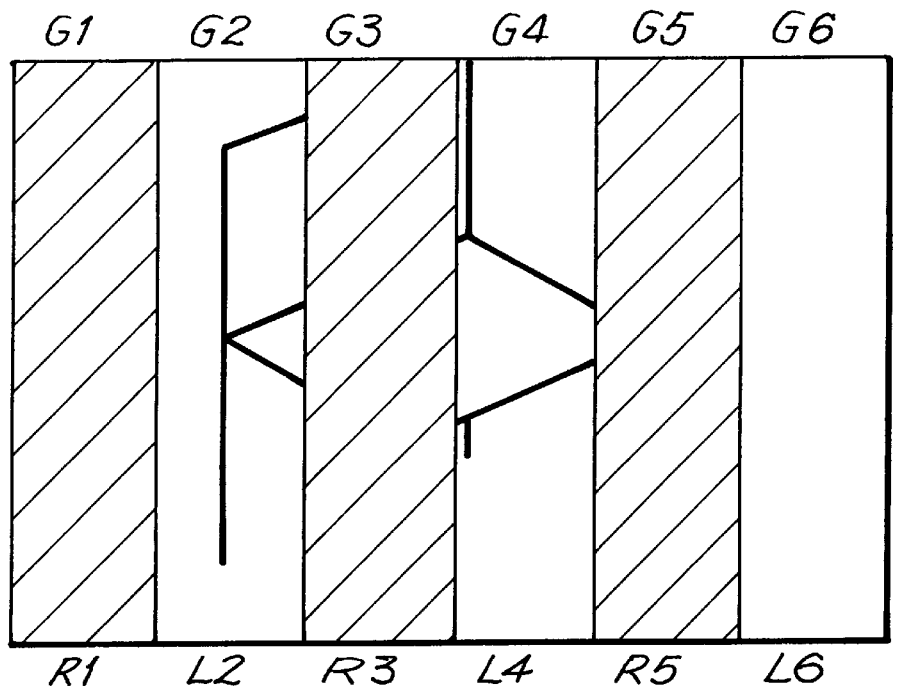
FIG. 15 shows the grid segments in a second position placed in front of the screen showing image segments in a second position as seen by the left eye of a viewer.

When the grid in a first position is placed in front of the screen showing the image segments in a first position, the left eye will see half of the left image segments. As seen in FIG. 14, the left eye can see part of the chair displayed in left image segments L1, L3 and L5. The image segments displayed on the screen alternate to a second position at the same time as the grid changes to a second position. The left eye then sees part of the chair displayed in left image segments L2, L4 and L6. This change from a first position to a second position of both the image segments and the grid segments occurs in a fraction of a second and the human brain merges these two images to form one complete image, as seen from left viewpoint L.

Figure 16:
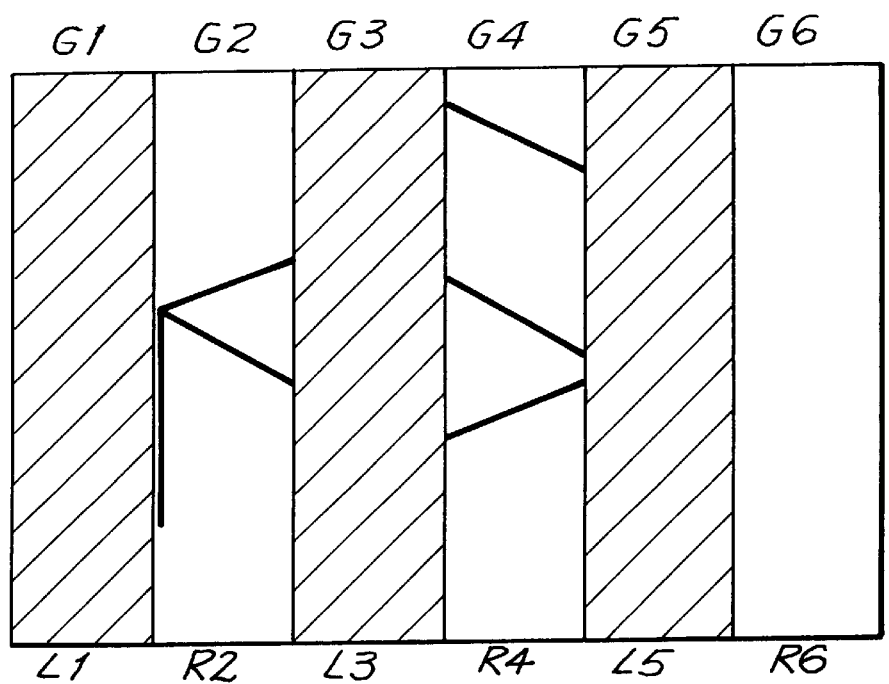
FIG. 16 shows the grid segments in a first position placed in front of the screen showing image segments in a first position as seen by the right eye of a viewer.
Figure 17:
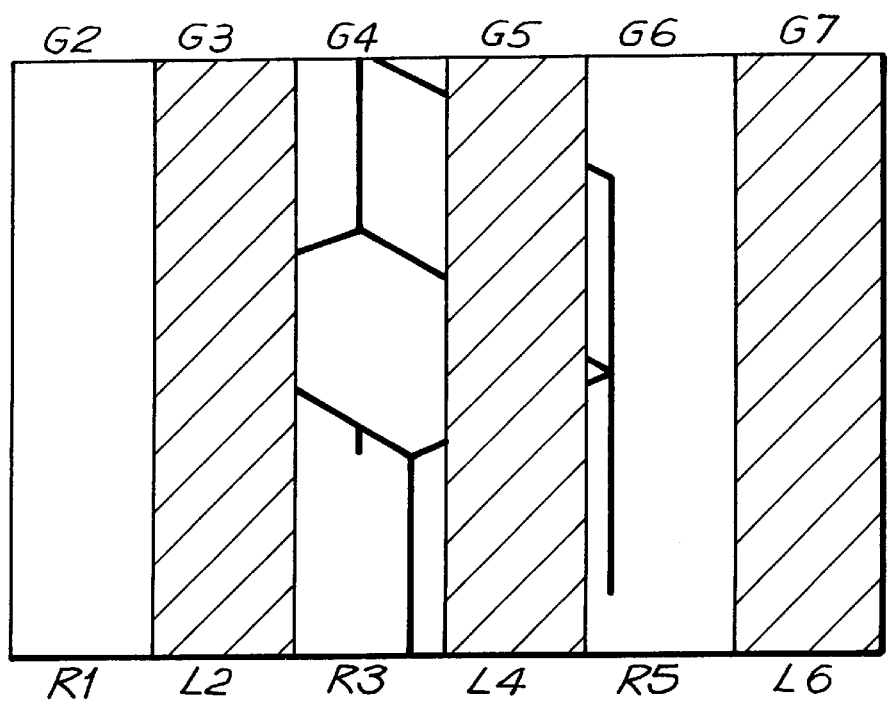
FIG. 17 shows the grid segments in a second position placed in front of the screen showing image segments in a second position as seen by the right eye of a viewer.

Similarly, when the grid in a first position is placed in front of the screen showing image segments in a first position, the right eye will see part of the chair displayed in right image segments R2, R4 and R6. This is shown in FIG. 16. A fraction of a second later, both the image segments and the grid segments move to their second position, and the right eye of the viewer then sees that part of the chair displayed in right image segments R1, R3 and R5. This happens so quickly that the brain merges the two half right images to form a whole image, as seen from viewing position R.

It will therefore be appreciated that in the normal use the present invention enables an image obtained from a left viewing position to be completely and exclusively displayed to the left eye of the viewer. This occurs as both the image segments and the grid segments oscillate from their respective first positions to their respective second positions and back to their first positions again. Because of the physical separation of the eyes, the same movement of image segments and grid segments also enables an image obtained from a right viewing position to be completely and exclusively displayed to the right eye of a viewer.

When only two angles of view are being displayed on a screen, the present invention allows for the whole of each angle of view to be displayed to the viewer. Previous methods of displaying three-dimensional imagery have only ever displayed partial angles of view to each eye.

Figure 18:
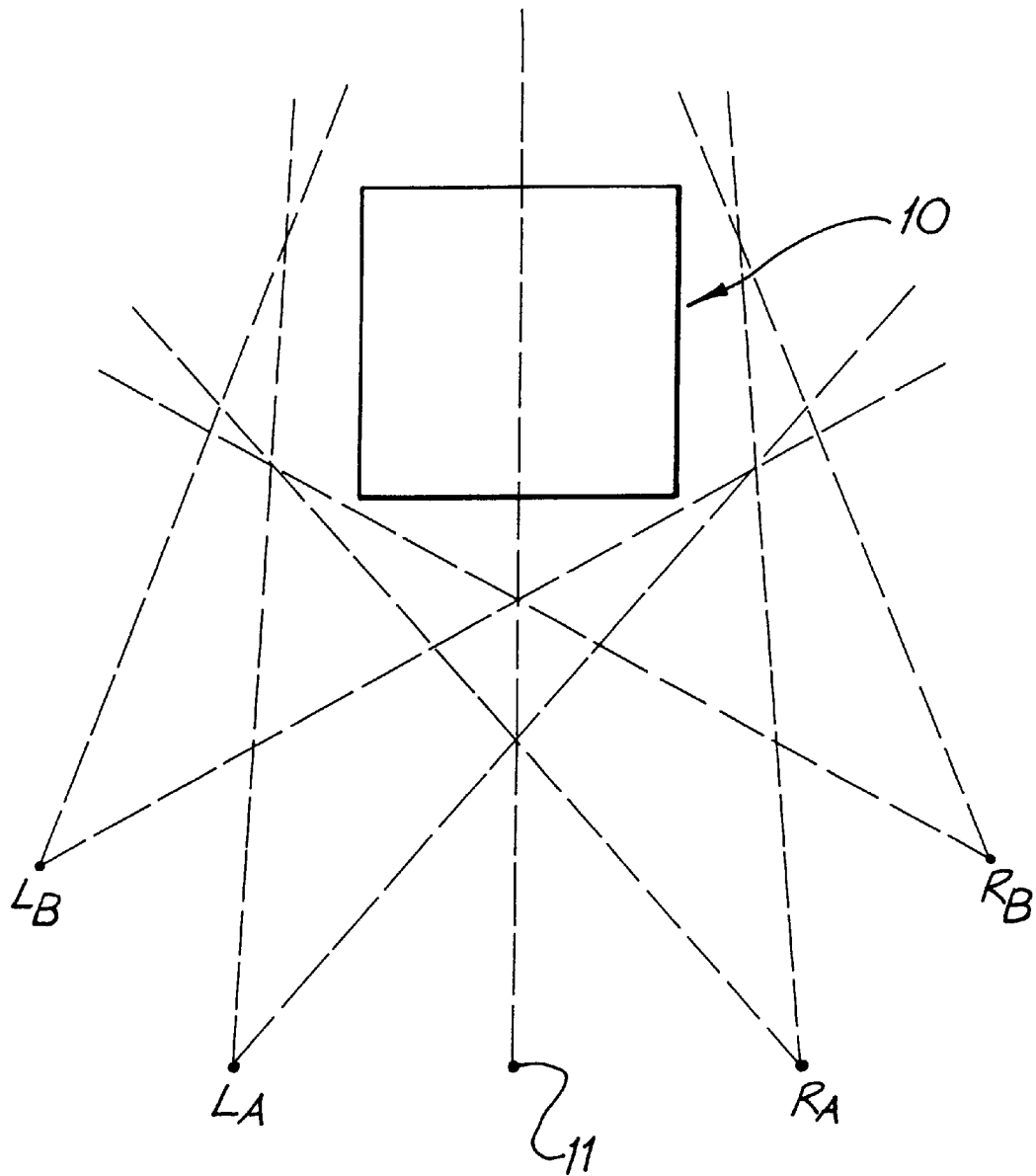
FIG. 18 is a top-view of a chair showing two left viewpoints $L_A$ and $L_B$ and two right viewpoints $R_A$ and $R_B$.

The present invention can also be used with more than two angles of view. For example, FIG. 18 shows the chair (10) as seen from above and shows two left viewing positions, $L_A$ and $L_B$ and two right viewing positions, $R_A$ and $R_B$.

Figure 19:
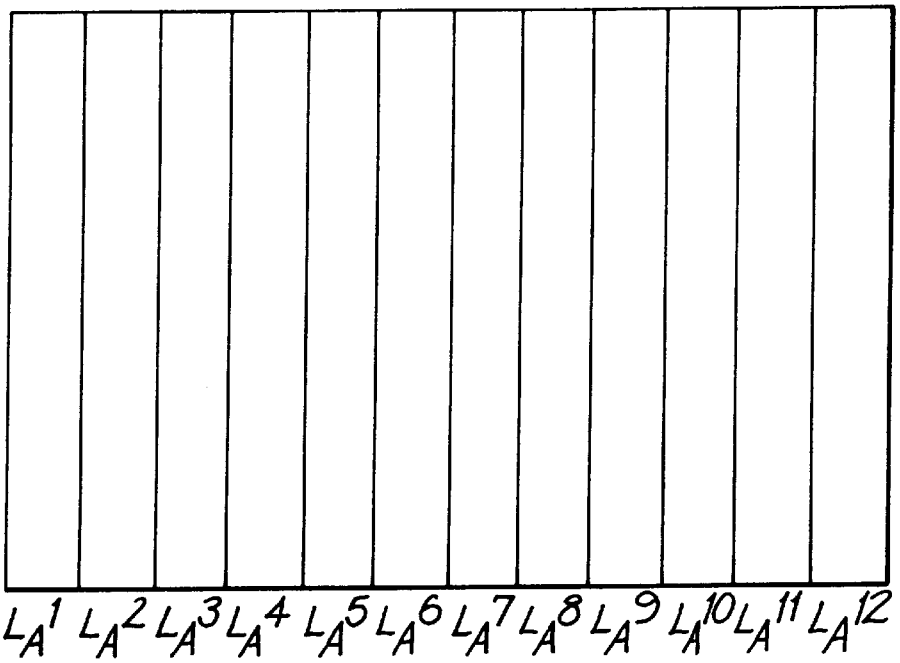
FIG. 19 shows the 12 image segments $L_A1$–$L_A12$ acquired from left viewpoint $L_A$.

FIG. 19 shows the 12 image segments $L_A1$–$L_A12$ acquired from left viewpoint $L_A$.

Figure 20:
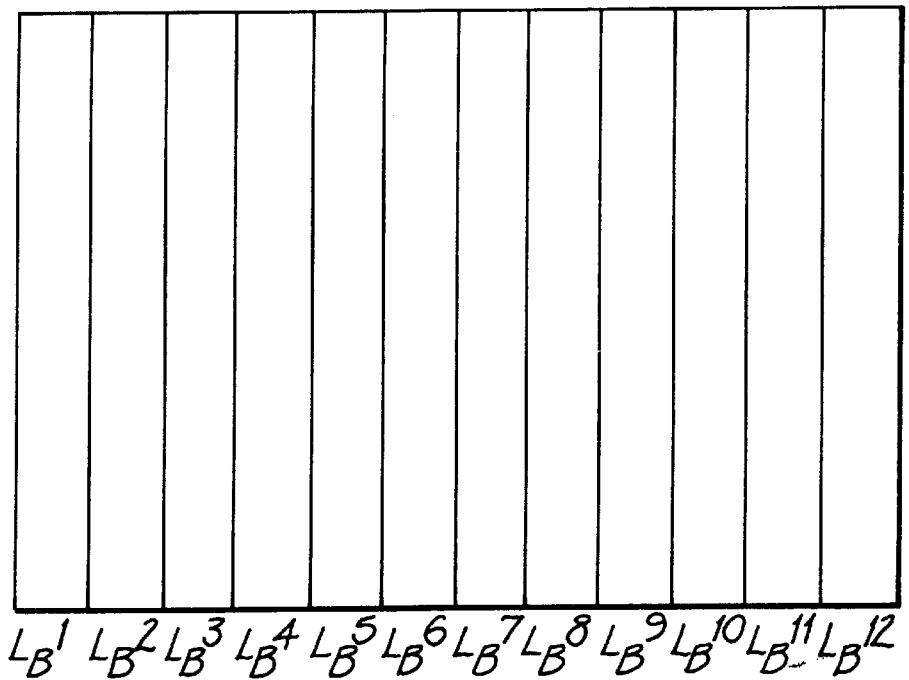
FIG. 20 shows the 12 image segments $L_B1$–$L_B12$ acquired from left viewpoint $L_B$.

FIG. 20 shows the 12 image segments $L_B1$–$L_B12$ acquired from left viewpoint $L_B$.

Figure 21:
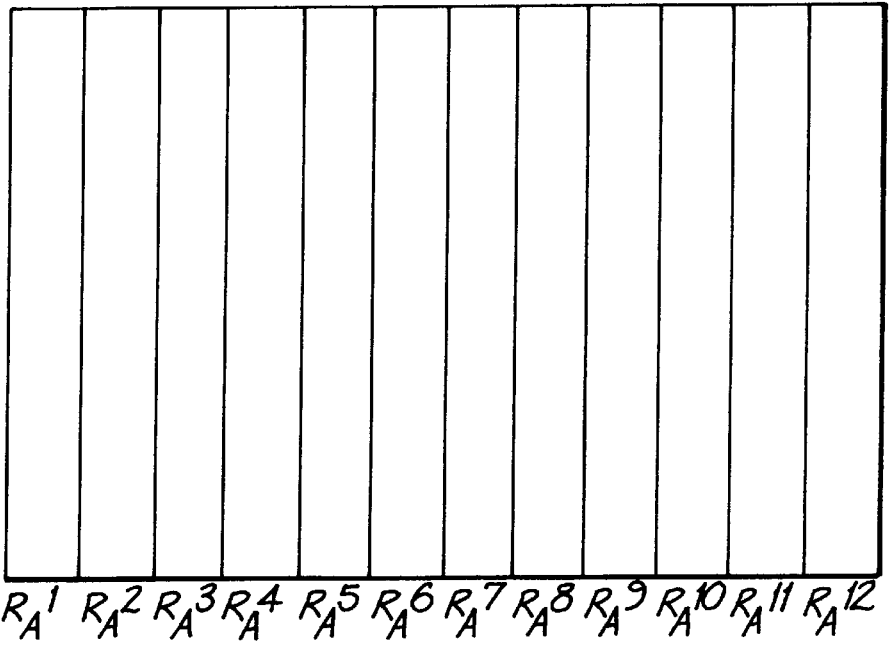
FIG. 21 shows the 12 image segments $R_A1$–$R_A12$ acquired from right viewpoint $R_A$.

FIG. 21 shows the 12 image segments $R_A1$–$R_A12$ acquired from right viewpoint $R_A$.

Figure 22:
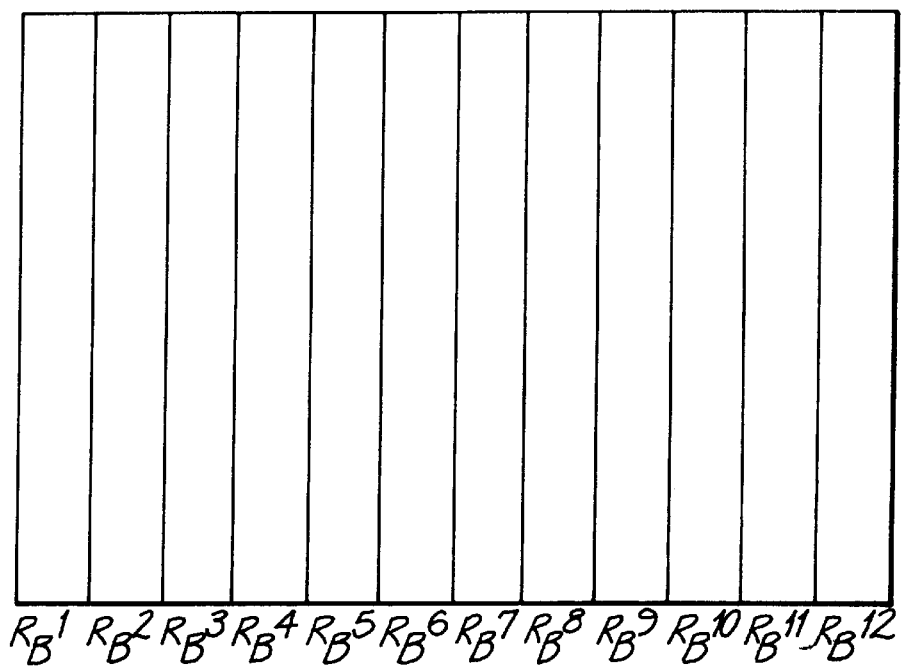
FIG. 22 shows the 12 image segments $R_B1$–$R_B12$ acquired from right viewpoint $R_B$.

FIG. 22 shows the 12 image segments $R_B1$–$R_B12$ acquired from right viewpoint $R_B$.

In order to combine the image segments acquired from all four viewpoints, the left and right image segments need to be interleaved across the screen in a uniform manner.

Figure 23:
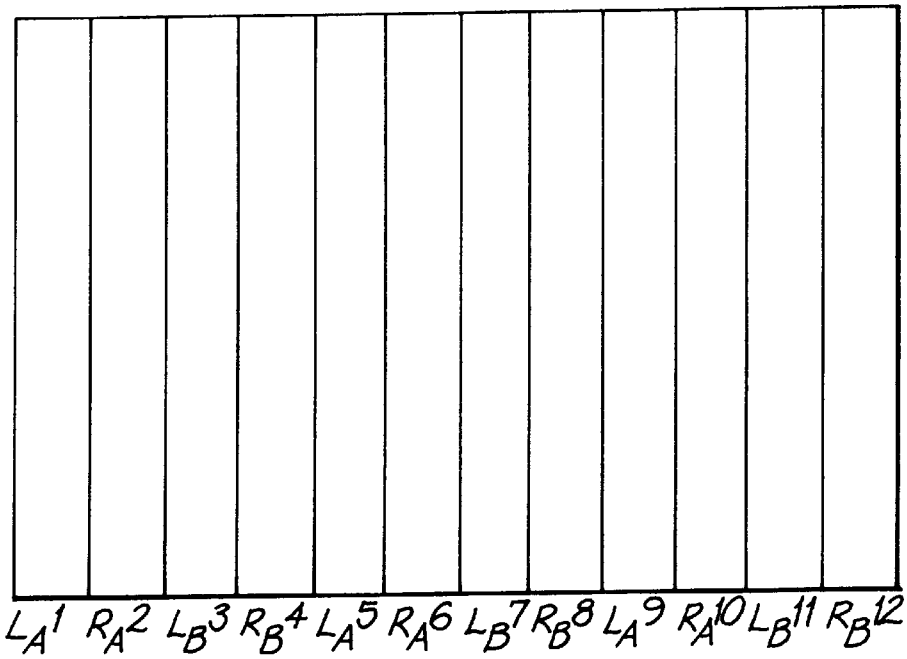
FIG. 23 shows the 12 image segments spread evenly across a screen in a first position.
Figure 24:
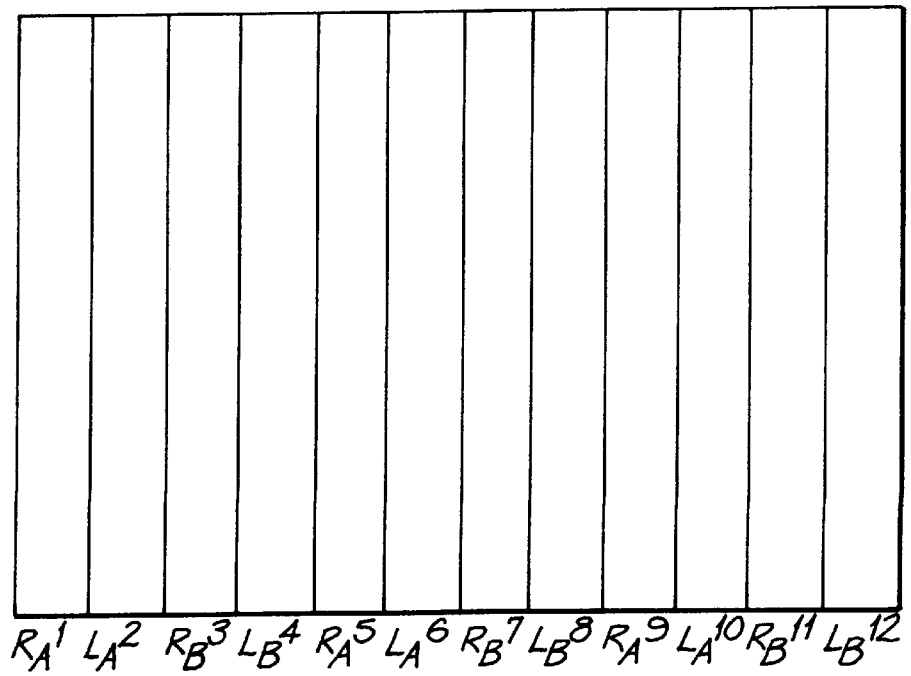
FIG. 24 shows the 12 image segments spread evenly across a screen in a second position.

FIG. 23 shows the twelve image segments spread evenly across a screen in a first position FIG. 24 shows the twelve image segments spread evenly across a screen in a second position It will be appreciated that when the image segments on the screen are in the first position and the grid segments (not shown) are in the first position, the left eye will see a quarter of the image segments acquired from viewpoint $L_A$ and a quarter of the image segments acquired from viewpoint $L_B$.

At the same time, the right eye will see a quarter of the image segments acquired from viewpoint $R_A$ and a quarter of the image segments acquired from viewpoint $R_B$.

When the image segments on the screen are in the second position and the grid segments (not shown) are in the second position, the left eye will then see a second quarter of the image segments acquired from viewpoint $L_A$ and a second quarter of the image segments acquired from viewpoint $L_B$.

At the same time, the right eye will see a second quarter of the image segments acquired from viewpoint $R_A$ and a second quarter of the image segments acquired from viewpoint $R_B$.

In total, when images acquired from four angles of view are displayed, each eye will only ever see half of each angle of view in any one cycle. The present invention does have significant advantages over the prior art in that it is able to display more than two angles of view, whereas most known systems can only display two angles of view.

It should be appreciated that modifications and improvements to the invention may be made without departing from the scope thereof as defined by the appended claims.

The claims defining the invention are as follows:

1. A method of producing three dimensional imagery comprising the steps of:
    a) displaying on a screen two sets of image segments, each set of said image segments being acquired from one of two spaced apart angles of view about a common centre of a subject of said imagery, one set acquired from an angle of view left of said common centre ("left acquired image segment set") and one set acquired from an angle of view right of said common centre ("right acquired image segment set"), said image segments being displayed in an alternating pattern across the screen without any dark bands interposed between the image segments such that only half of the image segments from the left acquired image segment set and half of the image segments from the right acquired image segment set are displayed in any one of two screen display positions;
    b) placing a segmented grid formed by a series of alternate spaced apart slats and openings in front of the screen between an observer and the screen such that the observer initially observes the image on the screen as separated and segmented, wherein the grid is of a size and shape which corresponds to the size of the image segments seen by the observer and wherein the grid is movable between a first and a second grid position in which the slats and openings exchange positions;
    c) setting the grid at a pre-determined distance from the screen such that;
        (i) when the grid is in a first position and the image segments are displayed on the screen in a first screen display position, a first half of the image segments from the left acquired image segment set are displayed on the screen and are seen through openings of said grid by the left eve of the observer and a first half of the image segments from the right acquired image segment set are displayed on the screen and are seen by the right eye of the observer; and
        (ii) when the grid is in a second position and the image segments are displayed on the screen in a second screen display position, a second half of the segments from the left acquired image segment set are displayed on the screen and are seen through openings of said grid by the left eye of the observer and a second half of the segments from the right acquired image segment set are displayed on the screen and are seen by the right eye of the observer;
    d) synchronously oscillating the grid at a predetermined frequency between its first and second positions as the image segments are sequentially displayed on the screen in their first and second screen display positions at that same predetermined frequency such that during said oscillation, the grid is rendered invisible and the observer sees a whole coherent three dimensional image by the observer's left eye sequentially observing first and second halves of the left acquired image segment set and the observer's right eve sequentially observing first and second halves of the right acquired image segment set and wherein the whole coherent three dimensional image can be seen by the observer from any position within a wide arc in front of the screen and grid arrangement.

2. A method according to claim 1 wherein the grid comprises electro-optical materials.

3. A method according to claim 2 wherein the grid size is selected according to the size of the screen and the viewing distance of the observer from the screen.

4. A method according to claim 3 wherein the grid is oscillated at a frequency within the range 50 Hz to 450 Hz.

5. A method according to claim 4 wherein the grid is in the form of a liquid crystal display.

6. An arrangement for production of a coherent three dimensional image comprising:
    a screen on which is projected two sets of image segments, each set of said image segments being acquired from one of two spaced apart angles of view about a common centre of a subject of said imagery;
    a segmented grid formed by a series of spaced apart slats and openings placed between an observer and the screen at a predetermined distance from the screen such that the segmented grid creates an appearance to the observer of screen image segments in a first grid position;

wherein, an observer sees, exclusively by the left eye, first separated segments of imagery acquired left of the common centre of said subject of said imagery through openings of said grid, while second separated segments of imagery acquired right of the common centre of said subject of said imagery are seen through the openings of the grid exclusively by the right eye of an observer, the first and second separated segments of imagery alternating across the screen without any dark bands interposed between image segments, such that a first half of the imagery is seen by the right and left eyes of the observer at a first position of the grid;

wherein both the grid and the position of the image segments are oscillated relative to one another and in a synchronous fashion at a predetermined frequency such that both the grid and the position of the image segments displayed move from said first position momentarily to a second position thence back to the first position whereupon when the grid is momentarily in said second position during said oscillation the left eye of the observer sees a second half of the whole image acquired left of the common centre which was previously not displayed at the first position, and the right eye of the observer sees a second half of the whole image acquired right of the common centre which was not displayed at the first position;

such that by virtue of the oscillation of both the grid and the image segments at said predetermined frequency, the grid is rendered invisible such that the observer sees a whole coherent three dimensional image by each eye alternately seeing a first half of the image, and then a second half of the image on the screen as the grid and the image segments move between the first and second positions and wherein the whole coherent three dimensional image can be observed from any point within a viewing room in front of the screen and grid arrangement and is independent of the position of the observer in the viewing room.

7. An apparatus according to claim 6 wherein the grid is of a size and shape which corresponds substantially to the size of the image segments such that the image segments are substantially the same dimension.

8. An apparatus according to claim 7 wherein the grid comprises electro-optical materials.

9. An apparatus according to claim 8 wherein the grid is oscillated at a frequency within the range 50 Hz–450 Hz.

10. An apparatus according to claim 6 wherein the grid is in the form of a liquid crystal screen.

11. A method of producing three dimensional imagery comprising the steps of:
(a) displaying on a screen four sets of image segments, each set of said image segments being acquired from one of four spaced apart angles of view about a common centre, two sets acquired from an angle of view left of a common centre ("left acquired image segment sets") and two sets acquired from an angle of view right of a common centre ("right acquired image segment sets"), said image segments being displayed in an alternating pattern across the screen without any dark bands interposed between image segments, such that only one quarter of the total number of image segments of each of said four sets of image segments are displayed in any one of four screen display positions;
(b) placing a segmented grid formed by a series of alternate spaced apart slats and openings in front of the screen between an observer and the screen such that the observer initially observes the image on the screen as separated and segmented, wherein the grid is of a size and shape which corresponds to the size of the image segments seen by the observer and wherein the grid is movable between a first and second grid position in which the slats and openings exchange positions;
(c) setting the grid at a predetermined distance from the screen such that:
  (i) when the grid is in a first position and the image segments are displayed on the screen in a first screen display position, a first quarter of the image segments from each of the two left acquired image segment sets are displayed on the screen and are seen through openings of said grid by the left eye of the observer and a first quarter of the image segments from each of the two right acquired image segment sets are displayed on the screen and are seen by the right eye of the observer;
  (ii) when the grid is in a second position and the image segments are displayed on the screen in a second screen display position, a second quarter of the image segments from each of the two left acquired image segment sets are displayed on the screen and are seen through openings of said grid by the left eye of the observer and a second quarter of the image segments from each of the two right acquired image segment sets are displayed on the screen and are seen by the right eye of the observer;
  (iii) when the grid returns to its first position and the image segments are displayed on the screen in a third screen display position, a third quarter of the image segments from each of the two left acquired image segment sets are displayed on the screen and are seen through openings of said grid by the left eye of the observer and a third quarter of the image segments from each of the two right acquired image segment sets are displayed on the screen and are seen by the right eye of the observer; and
  (iv) when the grid again moves to its second position and the image segments are displayed on the screen in a fourth screen display position, a fourth quarter of the image segments from each of the two left acquired image segment sets are displayed on the screen and are seen through openings of said grid by the left eye of the observer and a fourth quarter of the image segments from each of the two right acquired image segment sets are displayed on the screen and are seen by the right eye of the observer;
(d) synchronously oscillating the grid at a predetermined frequency between its first and second positions as the image segments are sequentially displayed on the screen in their first, second, third and fourth screen display position at that same predetermined frequency such that during said oscillation, the grid is rendered invisible and the observer sees a whole coherent three dimensional image by the observer's left eye sequentially observing first, second, third and fourth quarters of the two left acquired image segment sets and the observer's right eye sequentially observing first, second, third and fourth quarters of the two right acquired image segment sets and wherein the whole coherent three dimensional image can be seen by the observer from any position within a wide arc in front of the screen and grid arrangement.

12. A method according to claim 11 wherein the grid comprises electro-optical materials.

13. A method according to claim 12 wherein the grid size is selected according to the size of the screen and the viewing distance of the observer from the screen.

14. A method according to claim 13 wherein the grid is oscillated at a frequency within the range 50 Hz to 450 Hz.

15. A method according to claim 14 wherein the grid is in the form of a liquid crystal display.

16. A method of producing three dimensional imagery comprising the steps of:
  (a) displaying on a screen eight sets of image segments, each set of said image segments being acquired from one of eight spaced apart angles of view about a common centre, four sets acquired from an angle of view left of a common centre ("left acquired image segment sets") and four sets acquired from an angle of view right of a common centre ("right acquired image segment sets"), said image segments being displayed in an alternating pattern across the screen without any dark bands interposed between image segments such that only one eighth of the total number of image segments in each of the eight sets of image segments are displayed in any one of eight screen display positions;
  (b) placing a segmented grid formed by a series of alternate spaced apart slats and openings in front of the screen between an observer and the screen such that the observer initially observes the image on the screen as separated and segmented, wherein the grid is of a size and shape which corresponds to the size of the image segments seen by the observer and wherein the grid is movable between a first and second grid position in which the slats and openings exchange positions;
  (c) setting the grid at a pre-determined distance from the screen such that:
    (i) when the grid is in a first position and the image segments are displayed on the screen in a first screen display position, a first eighth of the image segments from each of the four left acquired image segment sets are displayed on the screen and are seen through openings of said grid by the left eye of the observer and a first eighth of the image segments from each of the four right acquired image segment sets are displayed on the screen and are seen by the right eye of the observer;
    (ii) when the grid is in a second position and the image segments are displayed on the screen in a second screen display position, a second eighth of the image segments from each of the four left acquired image segment sets are displayed on the screen and are seen through openings of said grid by the left eye of the observer and a second eighth of the image segments from each of the four right acquired image segment sets are displayed on the screen and are seen by the right eye of the observer;
    (iii) when the grid returns to its first position and the image segments are displayed on the screen in a third screen display position, a third eighth of the image segments from each of the four left acquired image segment sets are displayed on the screen and are seen through openings of said grid by the left eye of the observer and a third eighth of the image segments from each of the four right acquired image segment sets are displayed on the screen and are seen by the right eye of the observer;
    (iv) when the grid again moves to its second position and the image segments are displayed on the screen in a fourth screen display position, a fourth eighth of the image segments from each of the four left acquired image segment sets are displayed on the screen and are seen through openings of said grid by the left eye of the observer and a fourth eighth of the image segments from each of the four right acquired image segment sets are displayed on the screen and are seen by the right eye of the observer;
    (v) when the grid again returns to its first position and the image segments are displayed on the screen in a fifth screen display position, a fifth eighth of the image segments from each of the four left acquired image segment sets are displayed on the screen and are seen through openings of said grid by the left eye of the observer and a fifth eighth of the image segments from each of the four right acquired image segment sets are displayed on the screen and are seen by the right eye of the observer;
    (vi) when the grid again moves to its second position and the image segments are displayed on the screen in a sixth screen display position, a sixth eighth of the image segments from each of the four left acquired image segment sets are displayed on the screen and are seen through openings of said grid by the left eye of the observer and a sixth eighth of the image segments from each of the four right acquired image segment sets are displayed on the screen and are seen by the right eye of the observer;
    (vii) when the grid again returns to its first position and the image segments are displayed on the screen in a seventh screen display position, a seventh eighth of the image segments from each of the four left acquired image segment sets are displayed on the screen and are seen through openings of said grid by the left eye of the observer and a seventh eighth of the image segments from each of the four right acquired image segment sets are displayed on the screen and are seen by the right eye of the observer;
    (viii) when the grid again moves to its second position and the image segments are displayed on the screen in a eighth screen display position, an eighth eighth of the image segments from each of the four left acquired image segment sets are displayed on the screen and are seen through openings of said grid by the left eye of the observer and an eighth eighth of the image segments from each of the four right acquired image segment sets are displayed on the screen and are seen by the right eye of the observer;
  (d) synchronously oscillating the grid at a predetermined frequency between its first and second positions as the image segments are sequentially displayed on the screen in their first, second, third, fourth, fifth, sixth, seventh and eighth screen display positions at that same predetermined frequency such that during said oscillation, the grid is rendered invisible and the observer sees a whole coherent three dimensional image by the observer's left eye sequentially observing first, second, third, fourth, fifth, sixth, seventh and eighth of the four left acquired image segment sets and the observer's right eye sequentially observing first, second, third, fourth, fifth, sixth, seventh and eighth eighths of the four right acquired image segment sets and wherein the whole coherent three dimensional image can be seen by the observer from any position within a wide arc in front of the screen and grid arrangement.

17. A method according to claim 16 wherein the grid comprises electro-optical materials.

18. A method according to claim 17 wherein the grid size is selected according to the size of the screen and the viewing distance of the observer from the screen.

19. A method according to claim 18 wherein the grid is oscillated at a frequency within the range 50 Hz to 450 Hz.

20. A method according to claim 19 wherein the grid is in the form of a liquid crystal display.

* * * * *

UNITED STATES PATENT AND TRADEMARK OFFICE
CERTIFICATE OF CORRECTION

PATENT NO.    : 6,188,518 B1
DATED         : February 13, 2001
INVENTOR(S)   : DeLuca et al.

It is certified that error appears in the above-identified patent and that said Letters Patent is hereby corrected as shown below:

<u>Column 9,</u>
Line 24, "Positioned" should be -- positioned --.

<u>Column 12,</u>
Line 28, "lacking" should be -- locking --.
Line 41, following "once the" and before "portion", the following should be inserted -- retaining member is fully inserted into the slot, the locking surface being adapted to engage a --.

Signed and Sealed this

Sixth Day of November, 2001

Attest:

NICHOLAS P. GODICI
*Attesting Officer*    *Acting Director of the United States Patent and Trademark Office*